(12) United States Patent
Zhou et al.

(10) Patent No.: US 12,347,135 B2
(45) Date of Patent: Jul. 1, 2025

(54) GENERATING GESTURE REENACTMENT VIDEO FROM VIDEO MOTION GRAPHS USING MACHINE LEARNING

(71) Applicant: Adobe Inc., San Jose, CA (US)

(72) Inventors: Yang Zhou, Sunnyvale, CA (US);
Jimei Yang, Mountain View, CA (US);
Jun Saito, Seattle, WA (US); Dingzeyu Li, Seattle, WA (US); Deepali Aneja, Seattle, WA (US)

(73) Assignee: Adobe Inc., San Jose, CA (US)

( * ) Notice: Subject to any disclaimer, the term of this patent is extended or adjusted under 35 U.S.C. 154(b) by 352 days.

(21) Appl. No.: 18/055,310

(22) Filed: Nov. 14, 2022

(65) Prior Publication Data

US 2024/0161335 A1 May 16, 2024

(51) Int. Cl.
*G06K 9/00* (2022.01)
*G06F 16/683* (2019.01)
(Continued)

(52) U.S. Cl.
CPC .............. *G06T 7/73* (2017.01); *G06F 16/685* (2019.01); *G06F 40/242* (2020.01); *G06T 7/207* (2017.01)

(58) Field of Classification Search
CPC ......... G06T 7/73; G06T 7/207; G06T 13/205; G06T 2207/20081; G06T 2207/20084;
(Continued)

(56) References Cited

U.S. PATENT DOCUMENTS 11,335,334 B2 * 5/2022 Iwase ................... G10L 15/02
11,551,394 B2 * 1/2023 Biswas ................. G10L 15/02
(Continued)

FOREIGN PATENT DOCUMENTS

CN 112614508 A * 4/2021 ......... G06K 9/00335
CN 113507627 A * 10/2021 ............. G06N 3/045
(Continued)

OTHER PUBLICATIONS

Arikan, O. et al., "Interactive Motion Generation from Examples," ACM Transactions on Graphics, vol. 21, Issue 3, Jul. 2002, pp. 483-490.

(Continued)

*Primary Examiner* — Shervin K Nakhjavan
(74) *Attorney, Agent, or Firm* — Nicholson De Vos Webster & Elliott LLP

(57) ABSTRACT

Embodiments are disclosed for generating a gesture reenactment video sequence corresponding to a target audio sequence using a trained network based on a video motion graph generated from a reference speech video. In particular, in one or more embodiments, the disclosed systems and methods comprise receiving a first input including a reference speech video and generating a video motion graph representing the reference speech video, where each node is associated with a frame of the reference video sequence and reference audio features of the reference audio sequence. The disclosed systems and methods further comprise receiving a second input including a target audio sequence, generating target audio features, identifying a node path through the video motion graph based on the target audio features and the reference audio features, and generating an output media sequence based on the identified node path through the video motion graph paired with the target audio sequence.

17 Claims, 12 Drawing Sheets

(5 of 12 Drawing Sheet(s) Filed in Color)

(51) Int. Cl.
*G06F 40/242* (2020.01)
*G06T 7/207* (2017.01)
*G06T 7/73* (2017.01)

(58) Field of Classification Search
CPC . G06T 2207/30196; G06T 2207/30241; G06T 7/246; G06F 16/685; G06F 40/242; G06F 40/279
See application file for complete search history.

(56) References Cited

U.S. PATENT DOCUMENTS

| | | | | |
|---|---|---|---|---|
| 11,595,614 | B1* | 2/2023 | Mahyar | G11B 27/031 |
| 11,657,814 | B2* | 5/2023 | Marti | G06F 40/289 |
| | | | | 704/275 |
| 11,756,250 | B2* | 9/2023 | Richard | G10L 25/57 |
| | | | | 345/473 |
| 11,783,524 | B2* | 10/2023 | Vats | G06T 13/40 |
| | | | | 345/473 |
| 11,978,142 | B2* | 5/2024 | Kang | G06F 40/30 |
| 12,033,259 | B2* | 7/2024 | Kwatra | G10L 21/10 |
| 12,087,275 | B2* | 9/2024 | Stanton | G06N 3/08 |
| 2022/0335974 | A1* | 10/2022 | Butera | G06V 20/41 |
| 2022/0375224 | A1* | 11/2022 | Chae | G06V 10/806 |
| 2023/0326445 | A1* | 10/2023 | Adam | G06N 3/088 |
| | | | | 704/260 |
| 2023/0343324 | A1* | 10/2023 | Baeuml | G06F 40/56 |
| 2023/0360437 | A1* | 11/2023 | Shin | H04N 21/258 |
| 2024/0105160 | A1* | 3/2024 | Kim | G10L 13/10 |
| 2024/0257554 | A1* | 8/2024 | Xu | G06T 13/205 |
| 2024/0303830 | A1* | 9/2024 | Chae | G06T 5/50 |

FOREIGN PATENT DOCUMENTS

| | | | | |
|---|---|---|---|---|
| CN | 113822972 A | * | 12/2021 | G06T 13/40 |
| WO | WO-2021234151 A1 | * | 11/2021 | B25J 11/0005 |

OTHER PUBLICATIONS

Casiez, G. et al., "1€ Filter: A Simple Speed-based Low-pass Filter for Noisy Input in Interactive Systems," CHI'12, the 30th Conference on Human Factors in Computing Systems, May 2012, pp. 2527-2530.

Davis, A. et al., "Visual Rhythm and Beat," ACM Transactions on Graphics, vol. 37, No. 4, Article 122, Aug. 2018, pp. 1-11.

Jiang, H. et al., "Super SloMo: High Quality Estimation of Multiple Intermediate Frames for Video Interpolation," 2018 IEEE/CVF Conference on Computer Vision and Pattern Recognition, Jun. 2018, pp. 9000-9008.

Kovar, L. et al., "Motion Graphs," ACM Transactions on Graphics, vol. 21, Issue 3, Jul. 2002, pp. 473-482.

Loper, M. et al., "SMPL: A Skinned Multi-Person Linear Model," ACM Trans. Graph. 34, 6, Article 248, Nov. 2015, 16 pages.

Rubin, S.M. et al., "The LOCUS Model of Search and its Use in Image Interpretation," International Joint Conference on Artificial Intelligence, 1977, pp. 590-597.

Xiang, D. et al., "Monocular Total Capture: Posing Face, Body, and Hands in the Wild," 2019 IEEE/CVF Conference on Computer Vision and Pattern Recognition (CVPR), Jun. 2019, 10 pages.

Xiong, W. et al., "The Microsoft 2017 Conversational Speech Recognition System," ICASSP 2018—2018 IEEE International Conference on Acoustics, Speech and Signal Processing (ICASSP), Apr. 2018, pp. 1-9.

Yang, Y. et al., "Statistics-based Motion Synthesis for Social Conversations," ACM SIGGRAPH / Eurographics Symposium on Computer Animation 2020, vol. 39, No. 8, Oct. 2020, pp. 1-12.

Zhou, Y. et al., "MakeItTalk: Speaker-Aware Talking-Head Animation," ACM Transactions on Graphics, vol. 39, Issue 6, Article No. 221, Nov. 2020, pp. 1-15.

* cited by examiner

GENERATING GESTURE REENACTMENT VIDEO FROM VIDEO MOTION GRAPHS USING MACHINE LEARNING

BACKGROUND

Gesture is a key visual component for human speech communication. For example, hand and arm gestures can enhance the expressiveness of human performance and help the audience to better comprehend the content of speech. Unlike lip motions with specific phoneme-to-viseme mappings or facial expressions mostly corresponding to low-frequency sentimental signals, gestures can exhibit complex relationships with not only acoustics but also semantics of the audio. Thus, producing a video sequence that can match a given speech audio can present unique challenges.

Existing solutions that involve generating video for target audio have limitations and drawbacks, as they can be resource-intensive, while producing inadequate results.

SUMMARY

Introduced here are techniques/technologies that allow a digital design system to generate a gesture reenactment video sequence corresponding to a target audio sequence using a video motion graph generated from a reference speech video. The gesture reenactment video sequence can be fully rendered from a combination of original video frames and blended video frames from the reference speech video, resulting in a higher quality output.

In particular, in one or more embodiments, a digital design system can receive a first input including a reference speech video, which includes video of a speaker performing a speech. The digital design system can then generate a video motion graph representing the reference speech video, where each node of the video motion graph is associated with a frame of the reference video sequence and reference audio features of the reference audio sequence. Edges in the video motion graph that connect consecutive nodes represent natural transitions between video frames, while edges that connect non-consecutive nodes represent synthetic transitions. Subsequently, the digital design system can receive a second input including a target audio sequence for which a user is requesting the generation of a gesture reenactment video sequence from the reference speech video that best matches the speech content of the target audio sequence. The digital design system identifies a node path through the video motion graph based on target audio features of the target audio sequence and the reference audio features. The digital design system then generates an output media sequence, including an output video sequence generated based on the identified node path through the video motion graph paired with the target audio sequence.

The pose-aware video blending neural network is trained using training data that includes video frame triplets from a reference video.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying drawings in which.

DETAILED DESCRIPTION

Figure 1:
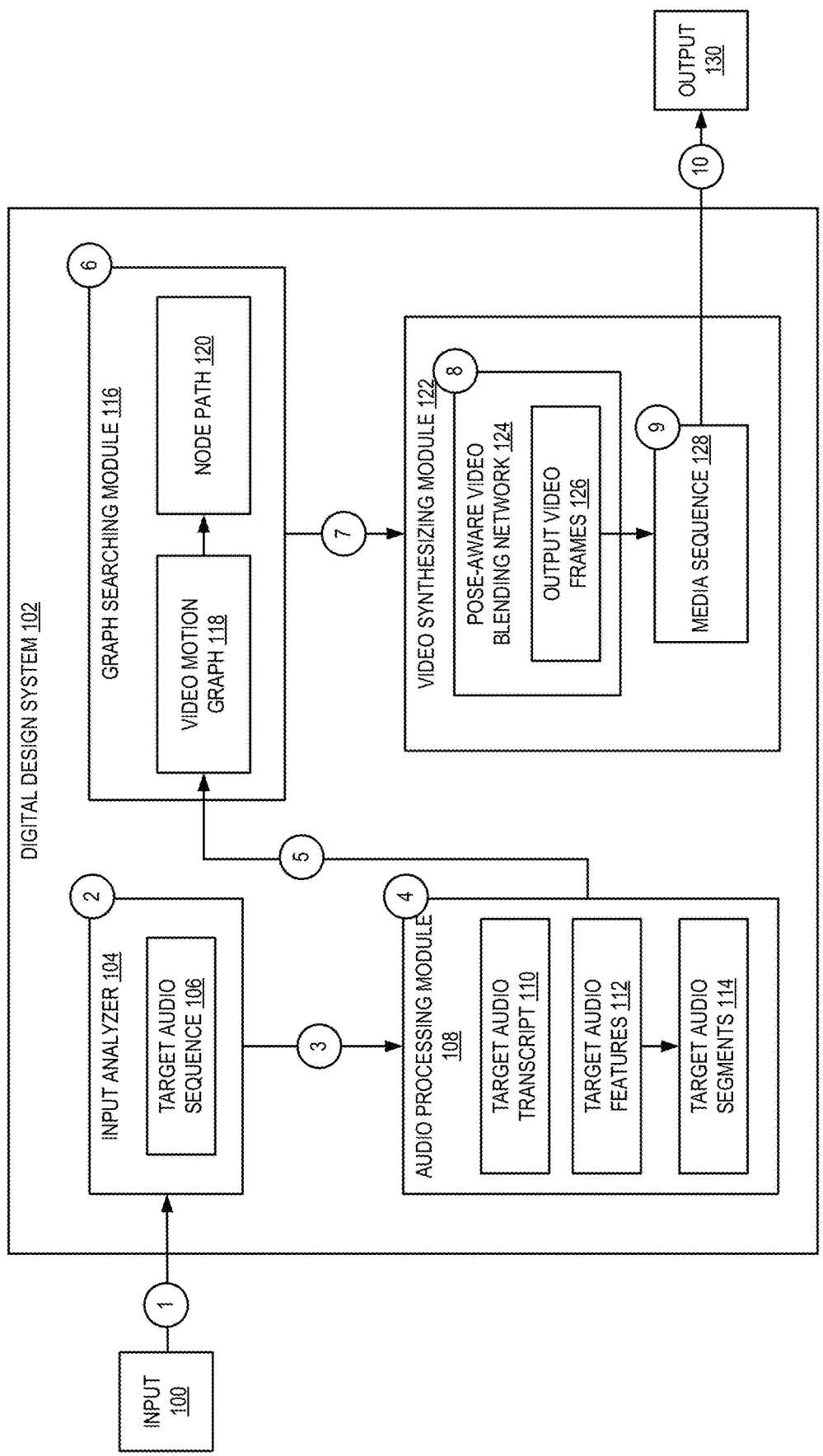
FIG. 1 illustrates a diagram of a process of generating a gesture reenactment video sequence for a target audio sequence using a trained network in accordance with one or more embodiments.

One or more embodiments of the present disclosure include a digital design system that uses a trained neural network to synthesize high-resolution, high-quality speech gesture videos for a target audio sequence (e.g., speech audio) directly in the video domain by cutting, re-assembling, and blending segments from a single input reference video. While existing solutions can generate video based on audio inputs, they have limitations and disadvantages.

Some existing solutions are able to synthesize video of a target speaker when they are also provided with a detailed, textured, and rigged 3D model of that speaker. For example, given a fully-rigged 3D avatar created by capturing the speaker's performance using a motion capture process, some existing solutions can then animate the avatar given a novel speech audio. However, this solution can produce a less realistic computer animated result, while also being resource expensive. And where a detailed, textured, and rigged 3D model for the speaker is not available, the results of such solutions can lack even more photorealism.

Additionally, other solutions predict body pose (i.e., a jointed skeleton) as an intermediate low dimensional representation to drive the video synthesis. However, they dissect the problem into two independent modules: audio-to-pose and pose-to-video. This process produces results suffering from noticeable artifacts, such as distorted body parts and blurred appearance of the subject or objects.

Some other solutions can use an audio input to predict a skeletal animation with gesture motions. They then translate the predicted skeletal gesture motions to photo-realistic speaker videos via neural image translation approaches. However, neural image translation is not artifact-free: disconnected moving object parts, as well as incoherent texture appearance are known issues in video generation. Due to the large number of parameters in such networks, these methods also require large datasets for training. Few-shot solutions do not have such dataset requirements, but they suffer from various artifacts, in particular for human pose synthesis, such as blurred appearance and distorted body parts. Other solutions fit human body models or/and texture parameters to a training video to improve the appearance of body shapes and texture at test time. However, inaccurate fitting easily results in artifacts and lose of subtleties, especially in the presence of loose clothing and detailed body parts, e.g., fingers.

To address these issues, the digital design system creates a directed graph for a reference speech video, referred to as a video motion graph, that encodes how the reference speech video may be split and re-assembled via different graph paths of natural and synthetic transitions. The video motion graph includes a plurality of nodes connected by edges, where each node is a frame of the reference speech video. The edges between consecutive nodes (frames) of the reference speech video are natural transitions, while edges between non-consecutive nodes are synthetic transitions generated between frames whose corresponding pose parameters are similar. Once the video motion graph is generated, the digital design system can identify a node path for a target audio sequence by traversing the different graph paths of the video motion graph. The target audio sequence can be of the same speaker in the reference speech video or from a different speaker. When the node path includes synthetic transitions, the digital design system can use a trained pose-aware video blending neural network to blend video frames adjacent to the synthetic transitions to smooth the transitions between non-consecutive video frames. The digital design system can then use the video frames from the video motion graph and the generated blended video frames to generate a gesture reenactment video that best fits the target audio sequence as an output.

By generating the output video sequence (e.g., the gesture reenactment video) by re-assembling segments from a reference video, the embodiments described herein can provide an increase in video quality while utilizing fewer computing resources. For example, the portions of the output video sequence that traverse natural transitions in the video motion graph can directly use the video frames that originate from the reference speech video. Even where video frames are blended (e.g., at synthetic transitions), the digital design system uses a pose-aware video blending neural network to blend the video frames that originate from the reference speech video. Because most of the video frames in the output media sequence originate from the reference speech video, the synthesized video preserves gesture realism as well as appearance subtleties versus existing solutions which generate the image all or a greater proportion of the video frames.

FIG. 1 illustrates a diagram of a process of generating a gesture reenactment video sequence for a target audio sequence using a trained network in accordance with one or more embodiments. The gesture reenactment video is generated by editing elements of the reference speech video such that the gesture reenactment video matches the target audio sequence. As shown in FIG. 1, a digital design system 102 receives an input 100, as shown at numeral 1. For example, the digital design system 102 receives the input 100 from a user via a computing device or from a memory or storage location. In one or more embodiments, the input 100 includes a target audio sequence 106.

As illustrated in FIG. 1, the digital design system 102 includes an input analyzer 104 that receives the input 100. In some embodiments, the input analyzer 104 analyzes the input 100, at numeral 2. In some embodiments, the input analyzer 104 analyzes the input 100 to extract, or identify, the target audio sequence 106 from the input 100. The target audio sequence 106 includes audio that a user is requesting the digital design system 102 to generate a gesture reenactment video sequence based on a reference speech video. The audio in the target audio sequence 106 can be from a same person as the subject in a reference speech video used to generate a video motion graph (e.g., video motion graph 118). The reference speech video can include a subject delivering a speech with both audio and video components The audio in the target audio sequence 106 can also be from a different person as the subject in the reference speech video. After extracting, or identifying, the target audio sequence 106, the input analyzer 104 sends the target audio sequence 106 to an audio processing module 108, as shown at numeral 3.

In one or more embodiments, the audio processing module 108 processes the target audio sequence 106, at numeral 4. In one or more embodiments, the audio processing module 108 generates a target audio transcript 110 and target audio features 112. In one or more embodiments, target audio features 112 include audio onset features and keyword features. Audio onset features are defined as a binary value indicating the activation of an audio onset for each frame detected. In one or more embodiments, a standard audio processing algorithm is used to detect audio onset frames. To extract keyword features, a speech-to-text engine converts the target audio sequence 106 into a target audio transcript 110. The target audio transcript 110 includes start and end times for each word in the target audio sequence 106.

Speech gestures can be classified into two types: referential gestures that appear together with specific, meaningful keywords, and rhythmic gestures which respond to the audio prosody features. More specifically, the key stroke of a rhythmic gesture can appear at the same time as (or within a very short of period of) an audio onset within a phonemic clause. Referential gestures, especially iconic and metaphoric gestures, typically appear together with certain keywords, such as action verbs, concrete objects, abstract concepts, and relative quantities to co-express the speech content. To generate the target audio transcript 110, the audio processing module 108 uses a dictionary of common keywords for referential gestures. The keywords in the dictionary of common keywords can be assigned to a specific category of gesture. Some example of entries in the dictionary of common keywords and corresponding categories are shown below:

| CATEGORY | KEYWORDS |
| --- | --- |
| GREETING | hey, hi, hello |
| COUNTING | one, two, three, first, second, third |
| DIRECTION | east, west, north, south, back, front, away, here, around |

-continued

| CATEGORY | KEYWORDS |
|---|---|
| SENTIMENT | crazy, incredible, surprising, screaming |
| ACTION | walk, drive, ride, enter, open, attach, take, move |
| RELATIVE | more, less, much, few |
| OTHERS | called |

For example, a keyword in the "greeting" category may be accompanied by a wave gesture in an audio-video sequence. In another example, a keyword in the "counting" category may be accompanied by a user gesture showing a number of fingers corresponding to the keyword. There may be additional categories and keywords assigned to a given category than those shown in the table.

Given the dictionary of common keywords for referential gestures, when a keyword is detected or identified at a frame (or node), the audio processing module 108 sets the keyword feature for the frame to that keyword. When a word other than a keyword is detected for a frame, the audio processing module 108 sets the keyword feature for the frame to "empty," (e.g., no keyword).

In one or more embodiments, the audio processing module 108 then segments the target audio sequence 106 into target audio segments 114 using the target audio features 112. In one or more embodiments, each segment of the target audio segments 114 starts and ends with audio frames where the audio onset features or keyword features are activated. Let $\{a_s\}_{s=1}^S$ be the frame indices of such frames, where S is the total number of frames. The target audio segments 114 can be represented as $a_s \rightarrow a_{s+1}$, and their duration can be represented as $L_s = a_{s+1} - a_s$ (number of frames). In one or more embodiments, two extra endpoints, $a_0=1$ and $a_{S+1}=N_t$, are added, indicating the first and last frame of the target audio sequence 106, respectively, to form the complete segment list. In such embodiments, the target audio segments 114 can be represented as $a_s \rightarrow a_{s+1}$, where s=0, 1, . . . , S.

After the target audio sequence 106 is processed by the audio processing module 108, the target audio segments 114 are sent to a graph searching module 116, as shown at numeral 5. The graph searching module 116 performs a search operation on a video motion graph 118 to generate a node path 120, as shown at numeral 6.

In one or more embodiments, the video motion graph 118 is a directed graph generated from an input reference video sequence. The reference video sequence can be a speech video from the same or different speaker as the speaker in the target audio sequence 106. In a process described in FIG. 6, the reference video sequence is encoded into a directed graph where each nodes represent a video frame and includes corresponding audio features for the video frame and audio transcript information, while edges between nodes represent transitions. In one or more embodiments, the transitions include original transitions between consecutive reference video frames and synthetic transitions between disjointed, or non-consecutive reference video frames.

The graph searching module 116 initializes a beam search procedure in the video motion graph 118 to find K plausible paths matching the target audio segments 114. For example, K can be set at 20. The beam search initializes K paths starting with K random nodes as the first frame $a_0$ for the target audio sequence 106, then expands in a breadth-first-search manner to find paths ending at a video motion graph node whose audio features most closely match the target audio features at the endpoint of the first segment, $a_1$, associated with either an activated audio onset or the same non-empty keyword feature. There can be multiple target graph nodes sharing the same audio feature with $a_1$.

In one or more embodiments, during the beam search, all the explored paths are sorted based on a path transition cost, plus a path duration cost. The path transition cost can be defined as the sum of node distances between all consecutive nodes m, n along the path, as follows:

$$\Sigma_{m,n}(d_{feat}(m, n)+d_{img}(m, n))$$

Typically, the cost of synthetic transitions are higher than natural transitions, which prevents the graph searching module 116 from identifying paths with too many synthetic transitions.

In one or more embodiments, when a path reaches a target graph node, the graph searching module 116 checks the duration. In some embodiments, where the video motion graph 118 is sparse, there may not be a path that exactly matches the length, $L_i$, of the target audio sequence 106. In one or more embodiments, the identified path should be as close to the length, $L_i$, as possible to avoid the need to overly accelerate or decelerate the path to adjust it to the exact length of the target audio sequence 106, which can result in unnaturally fast or slow gestures. In one or more embodiments, the graph searching module 116 only accepts paths with duration $L'_S \in [0.9L_S, 1.1L_S]$, as these can be slightly adjusted, e.g., re-sampled to match the length, $L_i$, of the target audio sequence 106. In some embodiments, a path duration cost $|1-L'_S/L_S|$ can be applied to favor paths identified during the beam search with durations closer to the duration of the target audio sequence 106.

For target audio segments 114 without any speech audio (e.g., the speaker is silent), the searched paths go through nodes without audio onset features. Typically, the nodes without audio onset features are frames with rest poses.

In one or more embodiments, the graph searching module 116 can also, or alternatively, perform a transcript search (e.g., by comparing the target audio transcript 110 with a reference audio transcript. In one or more embodiments, the results from the transcript search can be prioritized over the search based on the audio features.

In one or more embodiments, after processing the first segment $a_0 \rightarrow a_1$, the graph searching module 116 starts another beam search for the next segment $a_1 \rightarrow a_2$. Here, the path expansion starts with the last node of the K paths discovered from the previous iteration. The expansion continues with the same search procedure as above. In order, the searches run iteratively for the remaining segments $a_s \rightarrow a_{s+1}$, $s \in [1, S]$, while keeping the most plausible K paths. All searched K paths can be used to generate various plausible results for the target audio sequence 106. In one or more embodiments, the best path through the video motion graph 118 is selected as a node path 120. After the node path 120 that best matches the target audio sequence 106 is identified, the node path 120 is sent to a video synthesizing module 122, at numeral 7.

Figure 2:
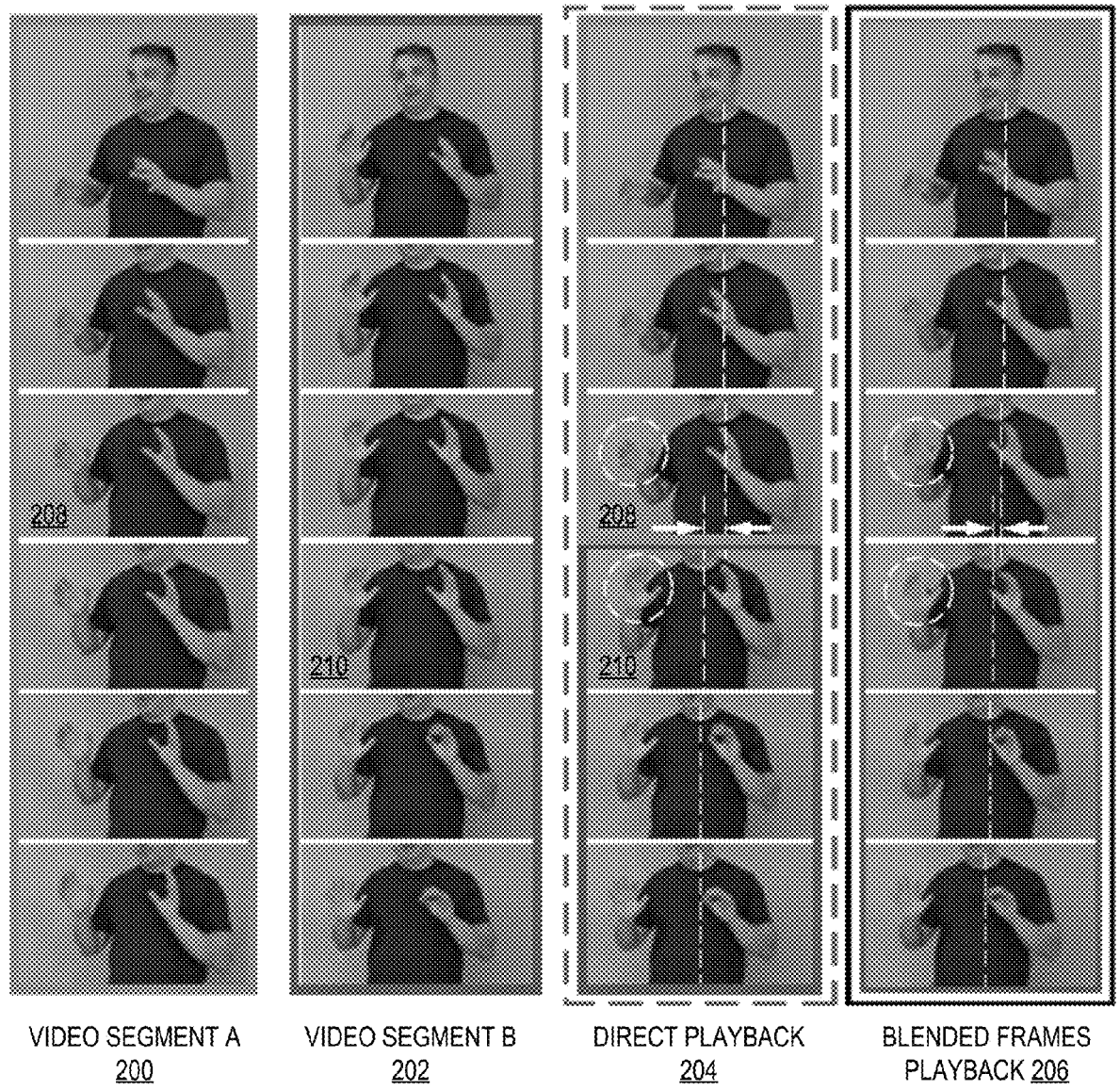
FIG. 2 illustrates example video segments with synthetic transitions in accordance with one or more embodiments.

As the node path 120 can include frames connected via synthetic transitions, an unprocessed playback of the node path 120 can result in noticeable jittering artifacts. FIG. 2 illustrates example video segments with synthetic transitions in accordance with one or more embodiments. In FIG. 2, video segment A 200 and video segment B 202 are separate portions of a reference video sequence used to generate a video motion graph (e.g., video motion graph 118). Based on the beam search, the graph searching module 116 has identified a best path that includes, at least the first three frames shown from video segment A 200 up to frame 208 and then across a synthetic transition to frame 210 of video segment B 202 and, at least, the last three frames of video segment B 202 shown in FIG. 2. However, an unprocessed, or direct playback 204 of the resulting path results in a jittering of the subject in video segment A 200 and video segment B 202. For example, between video frames 208 and 210, the subject's arms abruptly change shape and orientation. Blended frames playback 206 illustrates the result of a blending process performed by a video synthesizing module (e.g., video synthesizing module 122). Because of the blending process, a smoother transition has been generated across the synthetic transition in the blended frames playback 206, resulting in a smaller shift in the shape and orientation of the subject's hands across the video frames shown in comparison to the direct playback 204. Although the example in FIG. 2 depicts the blending process using three frames from each segment, the number of frames used in the blending process can be a dynamic value.

Returning to FIG. 1, to address the problem of jittery movement across synthetic transitions, the video synthesizing module 122 includes a pose-aware video blending network 124 that synthesizes blended frames to generate target video frames 126, at numeral 8. The pose-aware video blending network 124 is a neural network. In one or more embodiments, a neural network includes deep learning architecture for learning representations of audio and/or video. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. The synthesized blended frames generated by the pose-aware video blending network 124 replace original frames around a small temporal neighborhood of a synthetic transition so that the media sequence can smoothly transit from the sequence prior to the synthetic transition to the sequence following the synthetic transition.

Figure 3:
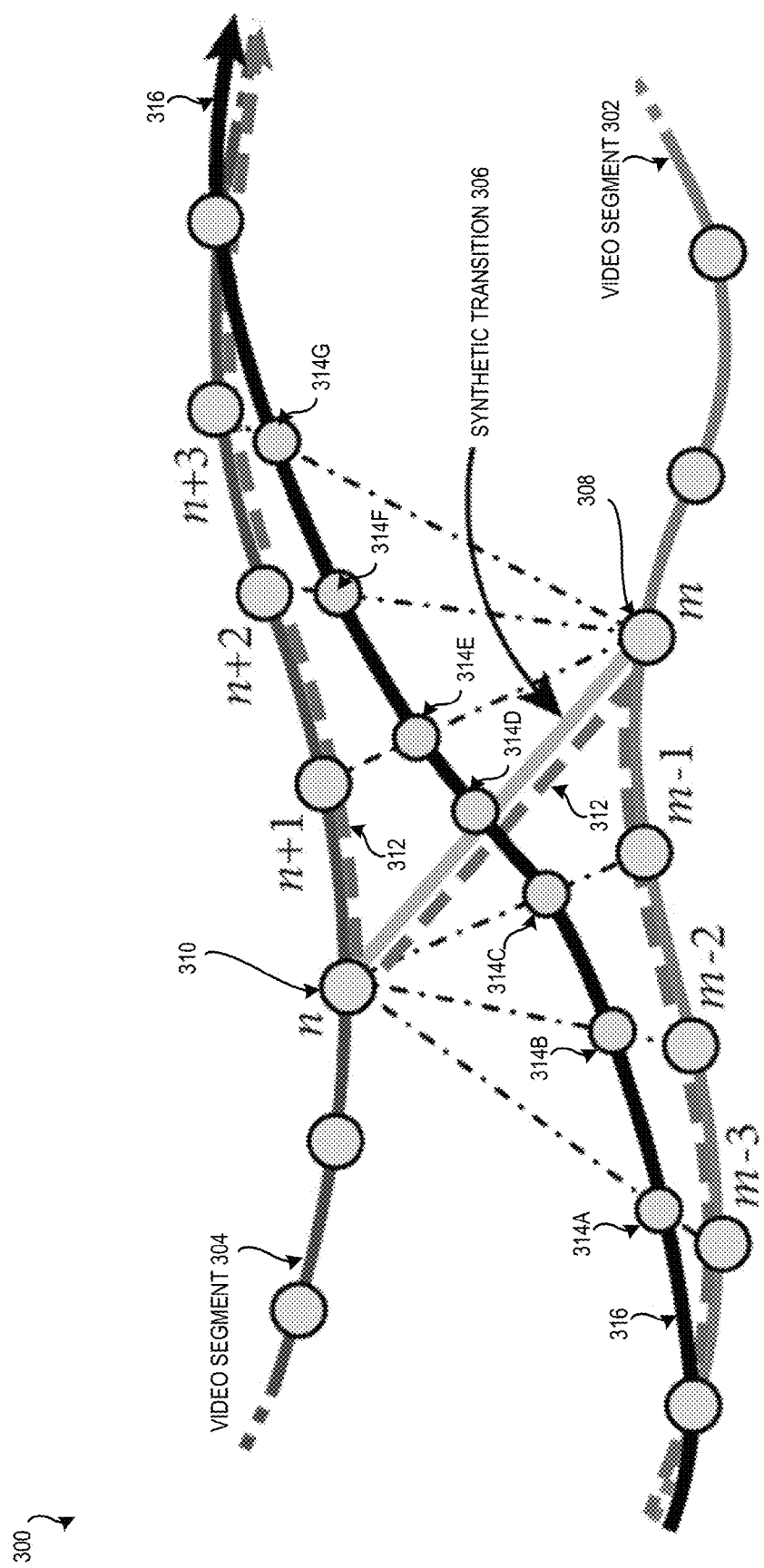
FIG. 3 illustrates a frame blending process performed by the pose-aware video blending network in accordance with one or more embodiments.

FIG. 3 illustrates a frame blending process performed by the pose-aware video blending network in accordance with one or more embodiments. FIG. 3 depicts portions of a video motion graph 300 including video segment 302 and video segment 304 with a synthetic transition 306 connecting node 308 to node 310, representing video frames m and n, respectively. A direct playback of the video frames across synthetic transition 306 is shown as dashed line 312. In one or more embodiments, for the synthetic transition 306, the temporal neighborhood can be defined using the frame range [m−k, m] and [n, n+k] with a neighborhood size k. In one or more embodiments, the value of k can be a parameter selected by a user, where greater values for k results in the blending of a greater number of frames. In one or more embodiments, the number of frames used in the blending process can be a dynamic value, where the range can vary from 1 to k. Larger values of k can result in slower and smoother transitions, while smaller values of k can result in sharper transitions.

Returning to FIG. 1, the pose-aware video blending network 124 then synthesizes new blended frames for the video frames within the temporal neighborhood. Given two frames with indices i, j (where i∈[m−k, m] and j∈[n, n+k]) and their corresponding raw RGB image representations $I_i$ and $I_j \in \mathbb{R}^{H \times W \times 3}$ from the reference video sequence, the pose-aware video blending network 124 synthesizes each blended frame in the neighborhood with a target blended weight $\alpha \in [0, 1/K, 2/K, \ldots, 1]$, where K=2 k. The pose-aware video blending network 124 uses the blending weight to estimate the SMPL pose parameter $\theta_t$ for a blended frame t as: $\theta_t = (1-\alpha) \theta_i + \alpha \theta_j$, where $\theta_i$ and $\theta_j$ are the SMPL pose parameters captured from two input frames respectively. The pose-aware video blending network 124 processes the images $I_i$ and $I_j$, the body foreground masks, and the pose parameters $\theta_i$, $\theta_j$, and $\theta_t$. In some embodiments, processing takes place in two stages: a mesh flow stage and an optical flow stage.

The mesh flow stage warps foreground human body image features based on a 3D motion field computed from vertex displacements of the fitted SMPL meshes. The second stage further refines the warping by computing the residual optical flow between the warped image features produced by the mesh flow stage, and the optical flow from the rest of the image (e.g., the background). Finally, an image translation network transforms the refined warped image features to the image $I_t$ representing the target output frame t.

The mesh flow stage has two parallel streams, each producing image deep feature maps encoding the warping for the input images $I_i$ and $I_j$. To produce these features, the pose-aware video blending network 124 computes an initial 3D motion field, which can be referred to as an initial "mesh flow," from the SMPL body mesh displacements between the two frames. To this end, the pose-aware video blending network 124 first finds the body mesh vertex positions $v_i$, $v_j$, and $v_t$ from the SMPL pose parameters $\theta_i$, $\theta_j$, and $\theta_t$, respectively. The pose-aware video blending network 124 then obtains the initial mesh flows, or motion fields, $F_{t \to i}^{init}$ and $F_{t \to j}^{init}$ as the displacement of the corresponding mesh vertices $v_t - v_i$ and $v_t - v_j \in \mathbb{R}^{N \times 3}$, respectively. In one or more embodiments, the pose-aware video blending network 124 only considers the displacements from visible vertices found via perspective projection onto an image plane. These displacements are projected and rasterized as image-space motion field $\mathbb{R}^{N \times 3} \to \mathbb{R}^{H \times W \times 2}$. Since the vertex sampling does not match the image resolution, the resulting flow fields are rather sparse. In one or more embodiments, they can be diffused with a Gaussian kernel with the value of σ set to 8.

Figure 4:
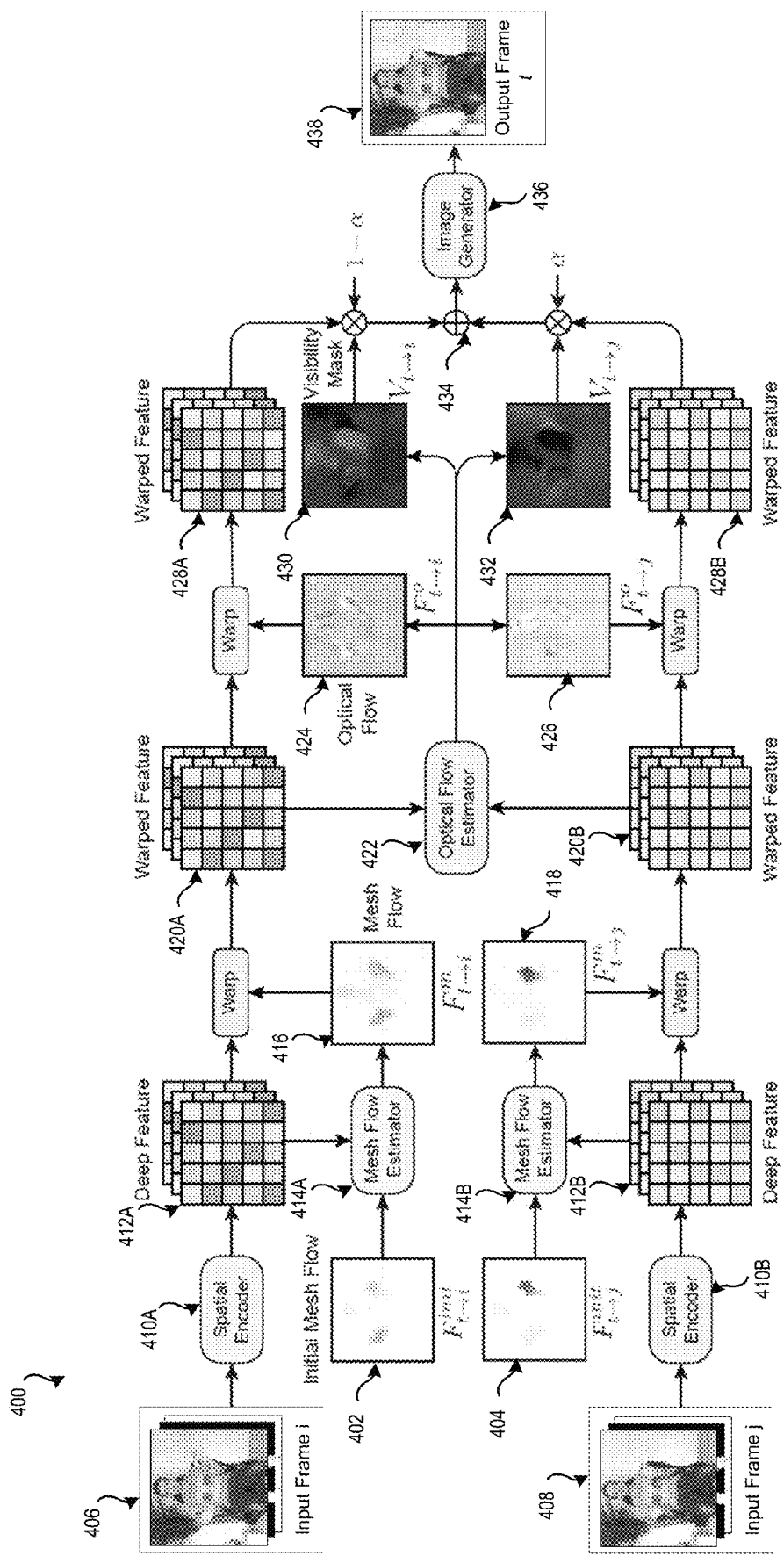
FIG. 4 illustrates a process of refining initial motion fields using a neural module in accordance with one or more embodiments.
Figure 5:
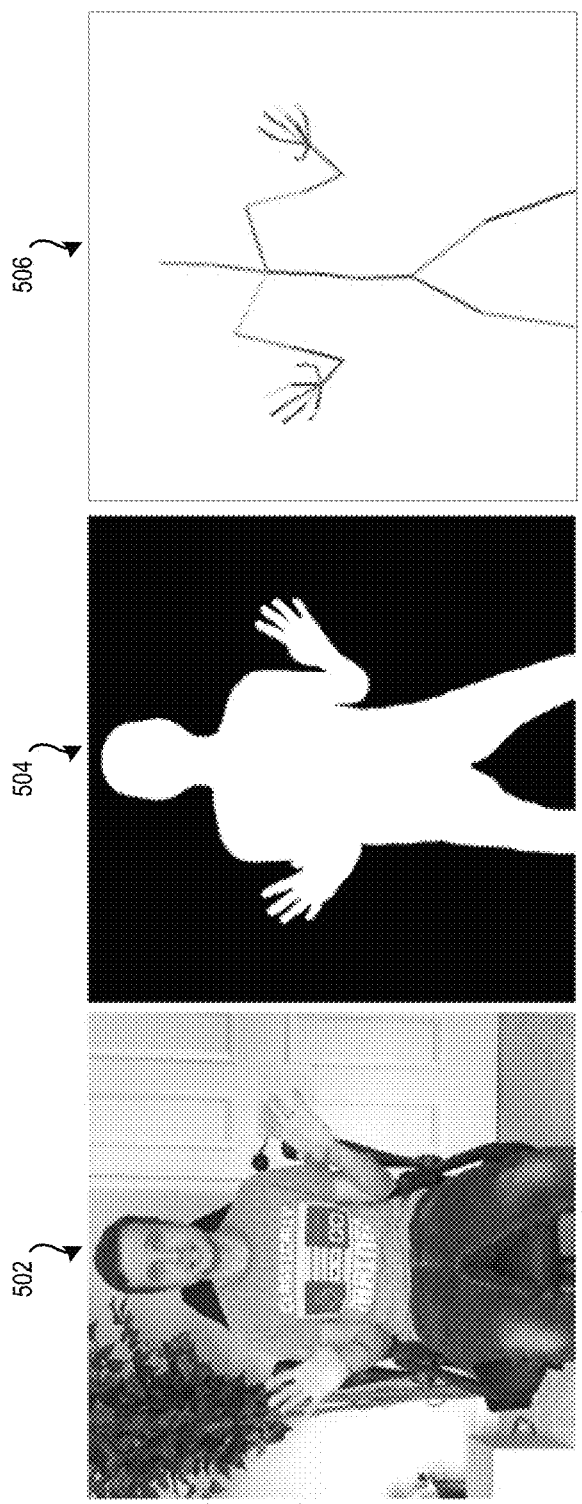
FIG. 5 illustrates an example input to a spatial encoder in accordance with one or more embodiments.

Because the boundaries of the projected mesh often do not exactly align with the boundaries of the human body in the input frames, the initial motion fields can be refined with a neural module. FIG. 4 illustrates a process of refining initial motion fields using a neural module in accordance with one or more embodiments. The module has two streams, each refining the corresponding initial motion field 402, $F_{t \to i}^{init}$, and initial motion field 404, $F_{t \to j}^{init}$, for one of input frame i 406 and input frame j 408, respectively. The first stream uses a spatial encoder 410A to process as inputs the RGB image $I_i$, the foreground mask $I_{mask}$ for image $I_i$, and an image containing a rendered skeleton $I_{skel}$ for image $I_i$ representing the SMPL pose parameters. FIG. 5 illustrates an example input to a spatial encoder in accordance with one or more embodiments. As illustrated in FIG. 5, the input provided to the spatial encoder (e.g., spatial encoder 410A) can include an input image frame 502, a corresponding foreground human mask 504, and a rendered skeleton image 506. The spatial encoder 410A then encodes them into an image deep feature map 412A, $x_i$, as follows:

$$x_i = E_s(I_i, I_{mask}, I_{skel}; w_s)$$

where $w_s$ are learnable weights. Similarly, the second stream produces an image deep feature map 412B, $x_j$, for frame j 408 using spatial encoder 410B, as follows:

$$x_j = E_s(I_j, I_{mask}, I_{skel}; w_s)$$

In one or more embodiments, the two streams share the same network based on eight stacked CNN residual blocks.

The image deep feature map 412A, $x_i$, and the initial motion fields 402, $F_{t \to i}^{init}$, are then passed through a mesh flow estimator network 414A, $E_m$, to estimate refined motion fields. Similarly, the image deep feature map 412B, $x_j$, and the initial motion fields 404, $F_{t \to j}^{init}$, are then passed through a mesh flow estimator network 414B, $E_m$. The resulting refined mesh flows can be defined as:

$$F_{t \to i}^m = E_m(x_i, F_{t \to i}^{init}; w_m),$$

$$F_{t \to j}^m = E_m(x_j, F_{t \to j}^{init}; w_m)$$

where $w_m$ are learnable weights. In one or more embodiments, the network is designed based on UNet. The pose-aware video blending network 124 then backward warps image deep feature map 412A, $x_i$, with refined motion field 416 to generate warped deep feature map 420A, $x'_i$. Similarly, the pose-aware video blending network 124 then backward warps image deep feature map 412B, $x_j$, with refined motion field 418 to generate warped deep feature map 420B, $x'_j$.

Synthesizing the final target frame directly from the two warped deep feature maps 420A and 420B can result in a ghosting effect because the motion fields calculated in the mesh flow stage are based on the SMPL model which ignores details such as textures on clothing. To address this issue, the optical flow stage aims to further warp the warped deep feature map 420A and warped deep feature map 420B based on optical flow computed through-out the image including the background. At this stage, the warped features already represent bodies that are roughly aligned. In one or more embodiments, an optical flow estimator 422 is a frame interpolation network based on optical flow that can reproduce the missing pixel-level details and remedy the ghost effect caused by the mesh flow stage. The optical flow estimator 422 predicts optical flow 424, $F_{t \to i}^O$, and optical flow 426, $F_{t \to j}^O$. The optical flows, or optical motion fields can then be used to further warp the warped deep feature map 420A, $x'_i$, and the warped deep feature map 420B, $x'_j$, resulting in refined warped deep feature map 428A, $x''_i$, and refined warped deep feature map 428B, $x''_j$, respectively.

In one or more embodiments, the optical flow estimator 422 further estimates soft visibility mask 430, $V_{t \to i}$, and visibility mask 432, $V_{t \to j}$. The visibility masks 430 and 432 can be used for blending to obtain a deep feature map 434, $x''_t$, for frame t, as follows:

$$x''_t = (1-\alpha) V_{t \to i} \odot x''_i + \alpha V_{t \to j} \odot x''_j$$

The pose-aware video blending network 124 then uses an image generator 436 to synthesize the target image $I_t$ as the output frame 438 of the pose-aware video blending network 122, using the deep feature map 434. In one or more embodiments, the image generator 436 is a generator network G following a UNet image translation network architecture, where $$\hat{I}_t = G(x''_t; w_g),$$

where $w_g$ are learnable weights.

Returning to FIG. 3, the process described above is repeated based on the neighborhood size, k, for each synthetic transitions in the node path 120. For the example in FIG. 3, the process is performed six times (e.g., for node pair "n" and "m−3," node pair "n" and "m−2," node pair "n" and "m−1," node pair "m" and "n+1," node pair "m" and "n+2," and node pair "m" and "n+3"). After the blending process is performed, a blended playback 316 is generated for synthetic transition 306. The blended playback 316 includes blended frames 314A-G that smooths the transition from video segment 302 to video segment 304.

Returning to FIG. 1, the video synthesizing module 122 then generates media sequence 128 using the output video frames 126, at numeral 9. In one or more embodiments, the digital design system 102 provides an output 130, including the media sequence 128, as shown at numeral 10. In one or more embodiments, after the process described above in numerals 1-9 the output 130 is sent to the user or computing device that initiated the request for an audio-driven gesture reenactment video sequence for a target audio sequence with the digital design system 102, to another computing device associated with the user or another user, or to another system or application. For example, after the process described above in numerals 1-10, the media sequence 128 can be displayed in a user interface of a computing device.

Figure 6:
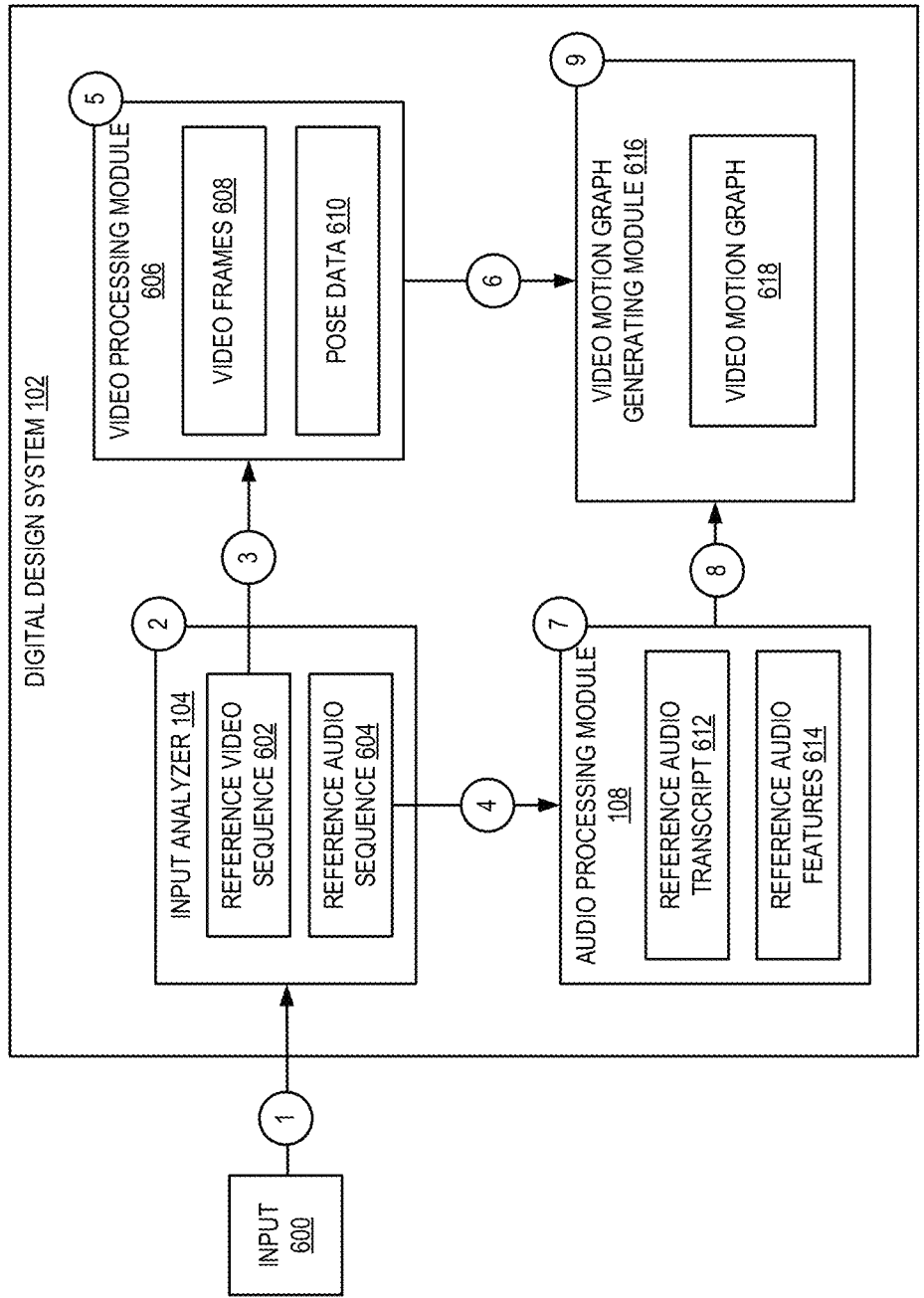
FIG. 6 illustrates a diagram of a process of generating a video motion graph from a reference speech video in accordance with one or more embodiments.

FIG. 6 illustrates a diagram of a process of generating a video motion graph from a reference speech video in accordance with one or more embodiments. As shown in FIG. 6, a digital design system 102 receives an input 600, as shown at numeral 1. For example, the digital design system 102 receives the input 600 from a user via a computing device or from a memory or storage location. In one or more embodiments, the input 600 includes a reference speech video.

As illustrated in FIG. 6, the digital design system 102 includes an input analyzer 104 that receives the input 600. In some embodiments, the input analyzer 104 analyzes the input 600, at numeral 2. In some embodiments, the input analyzer 104 analyzes the input 600 to extract, or identify, the reference speech video from the input 100. In one or more embodiments, the reference speech video includes a speaker performing a speech. The input analyzer 104 can further extract a reference video sequence 602 and a reference audio sequence 604 from the reference speech video. After extracting, or identifying, the reference video sequence 602 and the reference audio sequence 604, the input analyzer 104 sends the reference video sequence 602 to a video processing module 606, at numeral 3, and sends the reference audio sequence 604 to an audio processing module 108, as shown at numeral 4.

In one or more embodiments, the video processing module 606 processes the reference video sequence 602, at numeral 5. In one or more embodiments, the video processing module 606 generates video frames 608 representing the reference video sequence 602. The video processing module 606 can further generate pose data 610 for the video frames 608 of the reference video sequence 602. In one or more embodiments, the video processing module 606 extracts pose parameters, θ, of the SMPL model for all frames of the reference video sequence 602 using a motion capture process. After generating the video frames 608 and the pose data 610, the video processing module 606 sends the video frames 608 and the pose data 610 to a video motion graph generating module 616, as shown at numeral 6.

In one or more embodiments, the audio processing module 108 processes the reference audio sequence 604, at numeral 7. In one or more embodiments, the audio processing module 108 generates a reference audio transcript 612 and reference audio features 614 from the reference audio sequence 604. In one or more embodiments, reference audio features 614 include audio onset features and keyword features. Audio onset features are defined as a binary value indicating the activation of an audio onset for each frame detected. In one or more embodiments, a standard audio processing algorithm is used to detect audio onset frames. To extract keyword features, a speech-to-text engine converts the reference audio sequence 604 into a reference audio transcript 612. The reference audio transcript 612 includes start and end times for each word in the reference audio sequence 604.

To generate the reference audio transcript 612, the audio processing module 108 uses a dictionary of common keywords for referential gestures, as described previously. Given the dictionary of common keywords for referential gestures, when a keyword is detected or identified at a frame (or node) in the reference audio sequence 604, the audio processing module 108 sets the keyword feature for the frame to that keyword. When a word other than a keyword is detected for a frame, the audio processing module 108 sets the keyword feature for the frame to "empty," (e.g., no keyword). After the reference audio sequence 604 is processed by the audio processing module 108, the reference audio transcript 612 and reference audio features 614 are sent to the video motion graph generating module 616, as shown at numeral 8.

In one or more embodiments, the video motion graph generating module 616 generates a video motion graph 618, at numeral 9. The video motion graph 618 is a directed graph that encodes how the reference speech video may be split and re-assembled in different graph paths. Each graph node of the video motion graph 618 includes a raw reference video frame and corresponding audio features. The edges between nodes are defined as the transitions between frames, including natural transitions that connect consecutive frames in the reference video sequence 602 and synthetic transitions connecting disjointed, or non-consecutive, frames of the reference video sequence 602. The creation of synthetic transitions allows for expanded graph connectivity and enable nonlinear playback of the reference video sequence 602.

In one or more embodiments, based on the pose data 610 from the video processing module 606, the video motion graph generating module 616 computes the 3D positions in world space for all joints via forward kinematics. For each pair of frames $\forall(m, n)$, the video motion graph generating module 616 evaluates pose dissimilarity $d_{feat}(m, n)$ based on the Euclidean distance of their position and velocity of all joints.

To obtain the pose similarity in image space, for each frame m, the video motion graph generating module 616 projects a fitted 3D SMPL human mesh onto image space using known camera parameters and marks the mesh surface area which is visible on image after projection as $S_m$. Then for each pair of frames (m, n), the image space dissimilarity is estimated by the Intersection-over-Union (IoU) between their common visible surface areas, as follows $$d_{img}(m, n) = 1 - \frac{(S_m \cap S_n)}{(S_m \cup S_n)}$$

where the lower the value of $d_{img}(m, n)$ is, the higher the IoU, thus larger overlap exists in the surface area in the two meshes, indicating higher pose similarity in terms of image rendering.

Based on these two distance measurements, the video motion graph generating module 616 creates graph synthetic transitions between any pair of reference video frames (nodes in the video motion graph 618) if their distance $d_{feat}(m, n)$ and $d_{img}(m, n)$ are below predefined threshold values. Note that the distance values between consecutive frames (nodes) is defined as zero. In one or more embodiments, the threshold can be set as the average distance between close frames (m, m+l) in the reference video sequence 602, where l is a frame offset value. As the value of l is increased, the threshold value is increased, resulting in more synthetic transitions, and thus increasing the possible number of paths in the video motion graph 618. In one or more embodiments, as the possible number of paths (e.g., based on natural and synthetic transitions) increases, the larger the computational cost to perform the path searching algorithm (described in FIG. 1).

After the video motion graph generating module 616 generates the video motion graph 618, the video motion graph 618 can be stored for subsequent use when the digital design system 102 receives an input including a target audio sequence, as described in FIG. 1.

Figure 7:
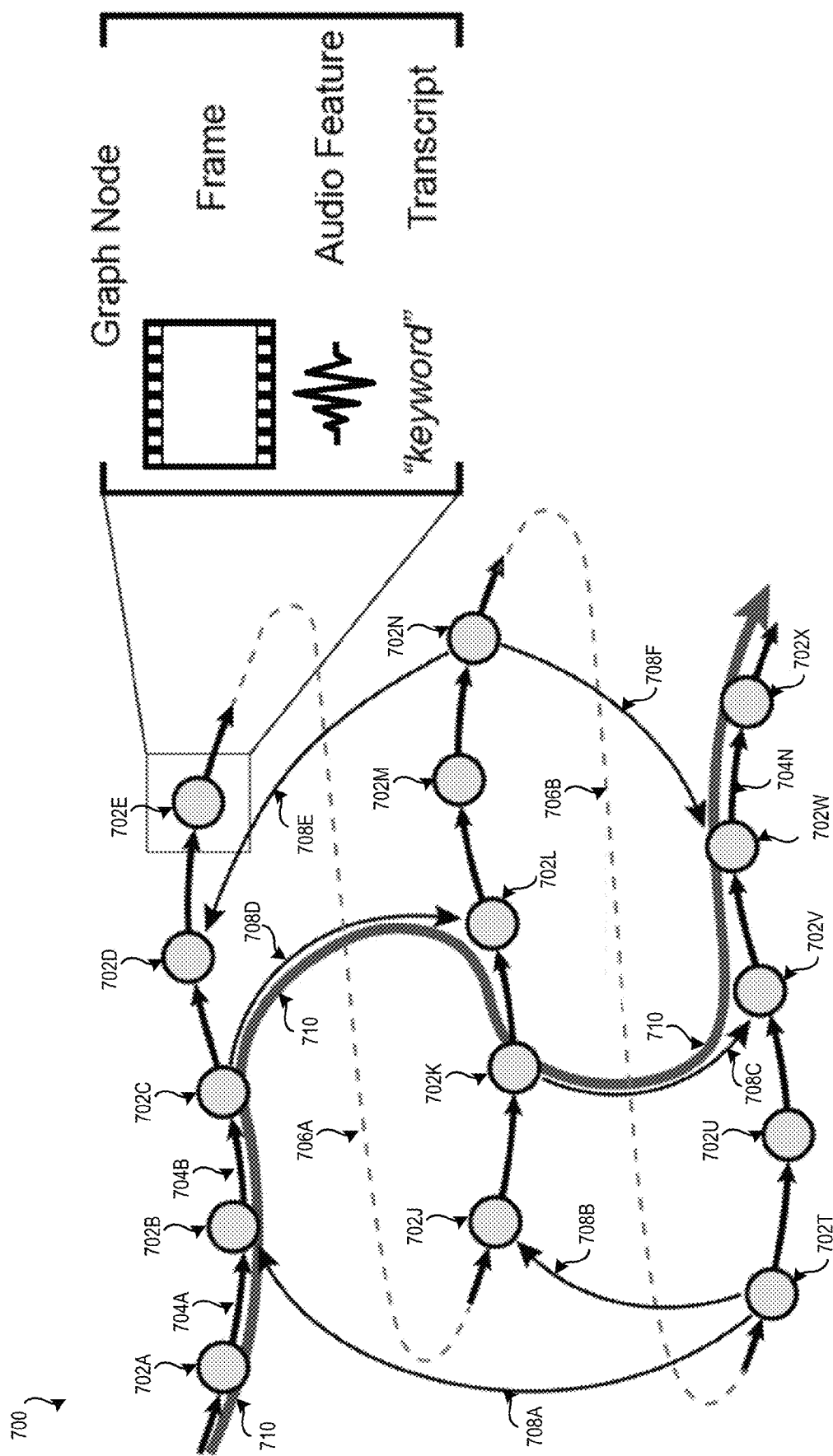
FIG. 7 illustrates an example video motion graph generated from a reference speech video in accordance with one or more embodiments.

FIG. 7 illustrates an example video motion graph generated from a reference speech video in accordance with one or more embodiments. The video motion graph 700 includes nodes 702A-E, 702J-N, and 702T-X, representing portions of a reference speech video. Each node represents a frame of the reference speech video. Edges connecting consecutive nodes represent natural transitions (e.g., edge 704A connecting nodes 702A and 702B, edge 704B connecting nodes 702B and 702C, edge 704N connecting nodes 702W and 702X, etc.). In one or more embodiments, the edges representing natural transitions between consecutive frames (nodes) can be bidirectional. Dashed lines 706A and 706B represent nodes and edges that are omitted from the visualization of the video motion graph 700.

As illustrated in FIG. 7, each node of the video motion graph 700 can include a video frame, an audio feature, and have an associated keyword (e.g., based on an audio transcript of the audio sequence in the reference speech video). Edges connecting non-consecutive nodes represent synthetic transitions. Synthetic transitions can be generated by comparing pairs of nodes and determining their similarity, as described in FIG. 6. Example synthetic transitions include edge 708A from node 702T to node 702B, edge 708B from node 702T to node 702J, edge 708C from node 702K to node 702V, edge 708D from node 702C to node 702L, edge 708E from node 702N to node 702D, and edge 708F from node 702N to node 702W.

As further illustrated in FIG. 7, given a target audio sequence and the video motion graph 700, the digital design system (e.g., digital design system 102) performs a search through the video motion graph 700 and identifies a playback path 710 through the video motion graph 700. The playback path 710 provides a plausible path through the video motion graph 700 where the frames represented by the nodes along the playback path 710 most closely match the contents of the target audio sequence.

Figure 8:
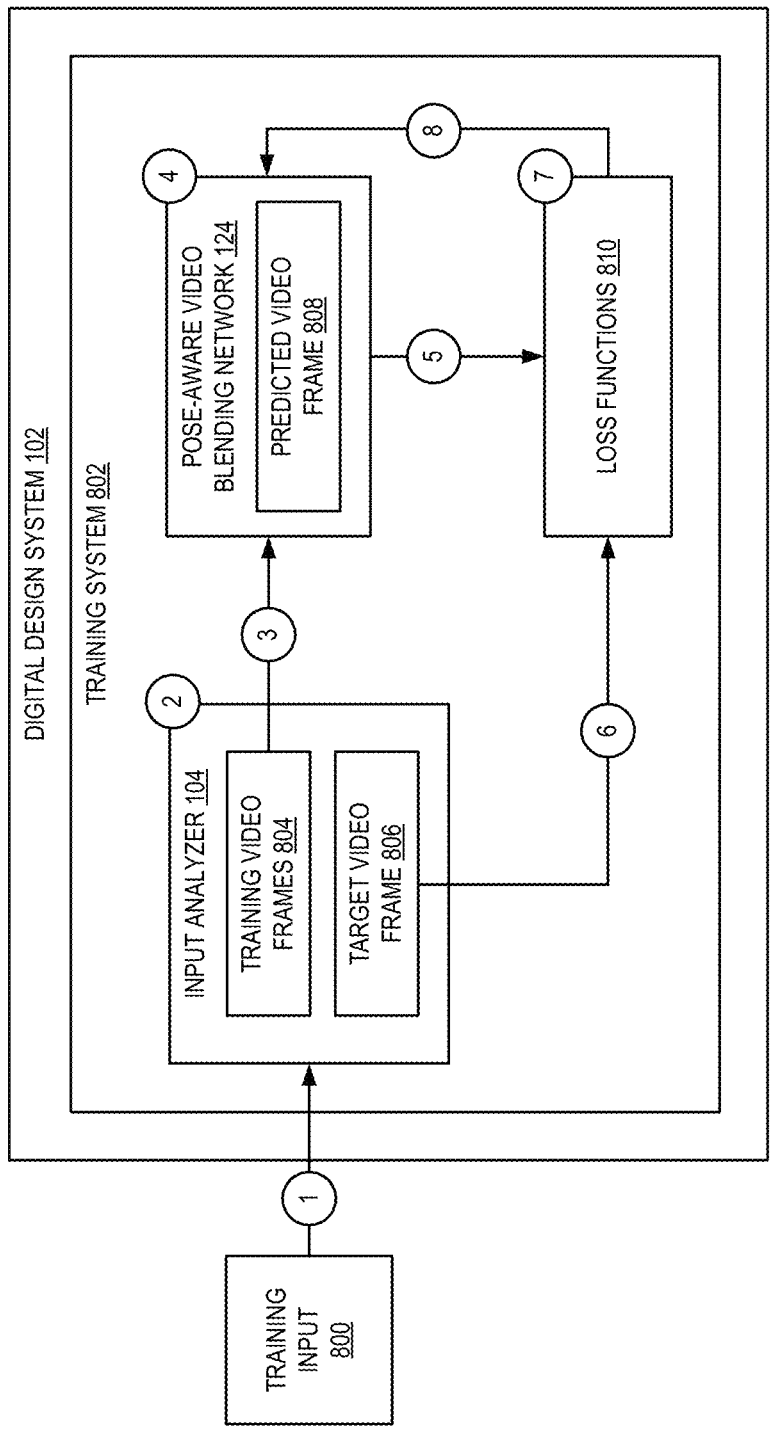
FIG. 8 illustrates a diagram of a training system for training a machine learning model to generate blending video frames in accordance with one or more embodiments.

FIG. 8 illustrates a diagram of a training system for training a machine learning model to generate blending video frames in accordance with one or more embodiments. In one or more embodiments, a training system 802 is configured to train a neural network (e.g., pose-aware video blending network 124) to generate blended video frames based on training inputs. Although the training system 802 is depicted as part of digital design system 102, in various embodiments, training system 802 can be a standalone system or a separate system implemented on electronic devices separate from the electronic devices implementing digital design system 102. In such embodiments, the training system 802 can be deployed to the digital design system 102.

As shown in FIG. 8, the training system 802 receives a training input 800, as shown at numeral 1. For example, the digital design system 102 receives the training input 800 from a user via a computing device or from a memory or storage location. In one or more embodiments, the training input 800 is from training data generated from a reference video, from which triplets of frames are sampled. For example, given a target frame e.g., frame t, two other nearby frames are randomly sampled with indices $t-k_0$ and $t+k_1$, where $k_0$, $k_1 \in [1, 8]$, to form triplets. In one or more embodiments, the training input 800 includes training video frames 804 (e.g., the randomly sampled frames) and a target video frame 806. The training input 800 can include multiple training image pairs and corresponding target video frames that can be fed to the training system 802 in parallel or in series.

In one or more embodiments, the digital design system 102 includes an input analyzer 104 that receives the training input 800. In some embodiments, the input analyzer 104 analyzes the training input 800, at numeral 2. In some embodiments, the input analyzer 104 analyzes the training input 800 to identify the training video frames 804 and the target video frame 806. In one or more embodiments, the input analyzer 104 sends the training video frames 804 to a pose-aware video blending network 124, as shown at numeral 3.

In one or more embodiments, the pose-aware video blending network 124 generates a predicted video frame 808 using the training video frames 804, as described with respect to FIG. 1, at numeral 4. The predicted video frame 808 is then sent to loss functions 810, as shown at numeral 5. The loss functions 810 can also receive the target video frame 806 (e.g., received in the training input 800), as shown at numeral 6. The loss functions 810 can use the target video frame 806 and the predicted video frame 808 to calculate a loss, at numeral 7.

In one or more embodiments, the loss functions 810 include an L1 reconstruction loss, $L_{rec}$, and a perceptual loss, $L_{per}$, between the predicted video frame 808, $\hat{I}_t$, and the target video frame 806, $I_t$, as follows:

$$L_{rec} = \mathcal{L}_1(I_t, \hat{I}_t)$$

$$L_{per} = \mathcal{L}_1(\phi(I_t), \phi(\hat{I}_t))$$

where $\phi(\cdot)$ concatenates feature map activations from a pre-trained VGG19 network.

Another L1 reconstruction loss, $L_{rec}^b$, is adopted to promote better frame reconstruction directly from the warped deep features $x''_i$ and $x''_j$ after they are passed through generator network G. This loss helps predict warped deep features such that they lead to generating video frames as close as possible to target video frame 806. This loss can be represented by:

$$L_{rec}^b = \mathcal{L}_1(I_t, G(x''_i)) + \mathcal{L}_1(I_t, G(x''_j))$$

Loss functions 810 include warping losses, $L_{warp}^m$ and $L_{warp}^o$, that measure the L1 reconstruction error between the target video frame 806 and the training video frames 804, $I_i$ and $I_j$, after being warped through the motion field, $F_{t \to i}^m$, and the optical flow, $F_{t \to i}^o$. The warping losses are as follows:

$$L_{warp}^m = \mathcal{L}_1(I_t, W(I_i, F_{t \to i}^m)) + \mathcal{L}_1(I_t, W(I_j, F_{t \to j}^m))$$

$$L_{warp}^o = \mathcal{L}_1(I_t, W(W(I_i, F_{t \to i}^m), F_{t \to i}^o)) + \mathcal{L}_1(I_t, W(W(I_j, F_{t \to j}^m), F_{t \to j}^o))$$

where W(I, F) applies backward warping flow F on image I.

Loss functions 810 further include a smoothness loss for both the mesh flow and the optical flow, as follows:

$$L_{sm} = \|\nabla F_{t \to i}^m\|_1 + \|\nabla F_{t \to j}^m\|_1 + \|\nabla F_{t \to i}^o\|_1 + \|\nabla F_{t \to j}^o\|_1$$

The overall loss, $\mathcal{L}$, can then be defined as the weighted sum of the previous losses, then average over all training frames, as follows:

$$\mathcal{L} = L_{rec} + \lambda_p L_{per} + \lambda_b L_{rec}^b + \lambda_m L_{warp}^m + \lambda_o L_{warp}^o + \lambda_s L_{sm}$$

In one or more embodiments, the weights have been set empirically as $\lambda_p = 0.01$, $\lambda_b = 0.25$, $\lambda_m = 0.25$, $\lambda_o = 0.25$, and $\lambda_s = 0.01$.

In one or more embodiments, to train the pose-aware video blending network 124, the mesh flow estimator network is first trained with $L_{warp}^m$ as a "warming stage." Then, a pre-trained optical flow model is loaded. Finally, the entire network is trained end-to-end with the overall loss, $\mathcal{L}$, above. In one or more embodiments, the network weights are optimized with Adam optimizer using PyTorch. The loss calculated using the loss functions 810 can then be back-propagated to the video blending network 120, as shown at numeral 8.

Figure 9:
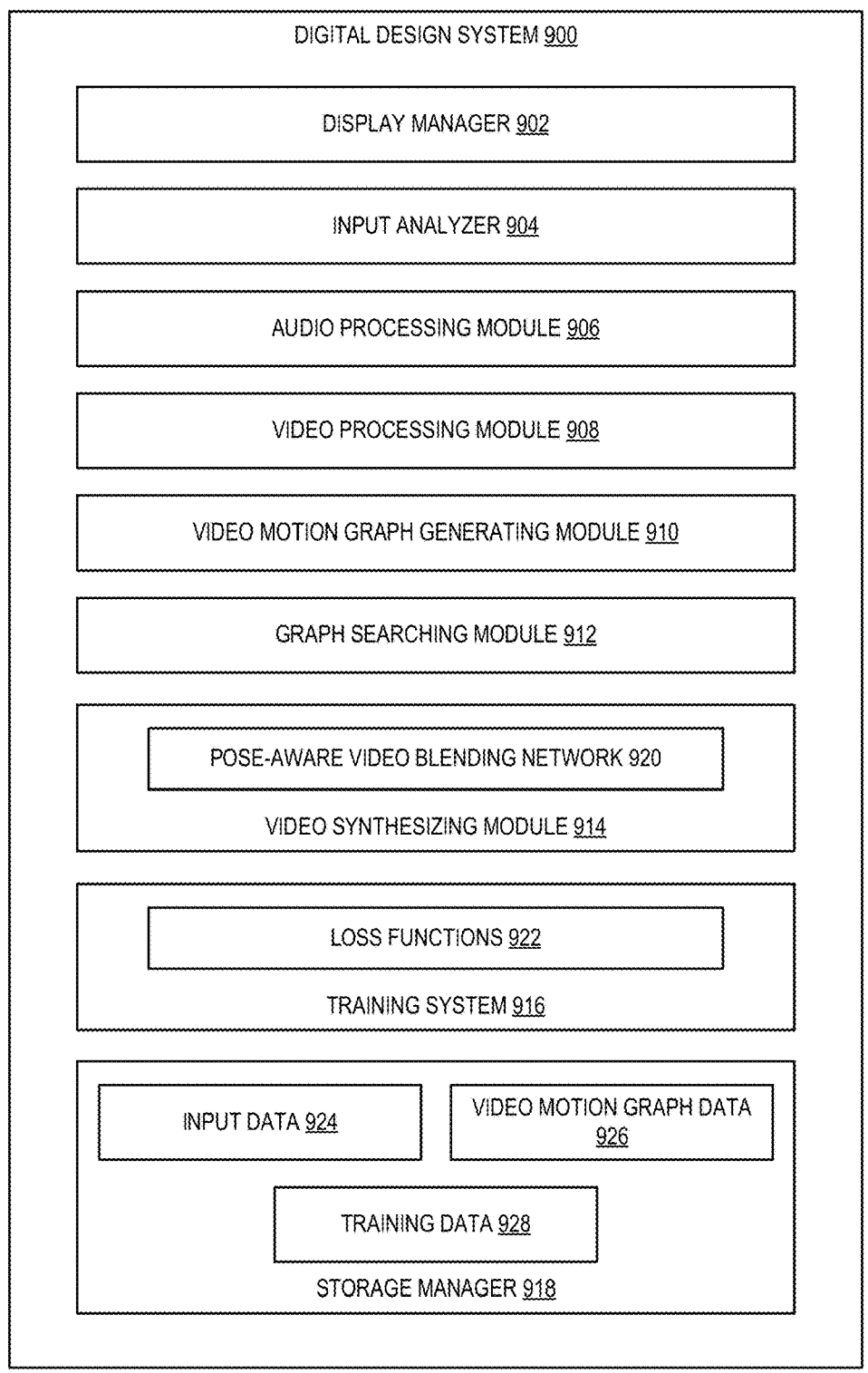
FIG. 9 illustrates a schematic diagram of a digital design system in accordance with one or more embodiments.

FIG. 9 illustrates a schematic diagram of a digital design system (e.g., "digital design system" described above) in accordance with one or more embodiments. As shown, the digital design system 900 may include, but is not limited to, a display manager 902, an input analyzer 904, an audio processing module 906, a video processing module 908, a video motion graph generating module 910, a graph searching module 912, a video synthesizing module 914, a training system 916, and a storage manager 918. As shown, the video synthesizing module 914 includes a pose-aware video blending network 920. The training system 916 includes loss function 922. The storage manager 918 includes input data 924, video motion graph data 926, and training data 928.

As illustrated in FIG. 9, the digital design system 900 includes a display manager 902. In one or more embodiments, the display manager 902 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 902 may identify, display, update, or otherwise provide various user interfaces that include one or more display elements in various layouts. In one or more embodiments, the display manager 902 can identify a display provided on a touch screen or other types of displays (e.g., including monitors, projectors, headsets, etc.) that may be interacted with using a variety of input devices. For example, a display may include a graphical user interface including one or more display elements capable of being interacted with via one or more touch gestures or other types of user inputs (e.g., using a stylus, a mouse, or other input devices). Display elements include, but are not limited to buttons, text boxes, menus, thumbnails, scroll bars, hyperlinks, etc.

As further illustrated in FIG. 9, the digital design system 900 also includes an input analyzer 904. The input analyzer 904 analyzes an input received by the digital design system 900 to identify video and/or audio sequences, training video frames, target video frames, etc. In one or more embodiments, the input analyzer 904 is further configured to extract a reference video sequence and a reference audio sequence from a reference speech video.

As further illustrated in FIG. 9, the digital design system 900 also includes an audio processing module 906. The audio processing module 906 is configured to analyze and process reference audio sequences and target audio sequences to generate an audio transcript and audio features. In one or more embodiments, audio features include audio onset features and keyword features. Audio onset features are defined as a binary value indicating the activation of an audio onset for each frame detected. In one or more embodiments, a standard audio processing algorithm is used to detect audio onset frames. To extract keyword features, a speech-to-text engine converts the audio sequence into an audio transcript.

As further illustrated in FIG. 9, the digital design system 900 also includes a video processing module 908. The video processing module 908 is configured to analyze and process reference video sequences to segment reference video sequences into a plurality of video frames. The video processing module 908 is further configured to generate pose data for each of the plurality of video frames (e.g., using a motion capture process).

As further illustrated in FIG. 9, the digital design system 900 also includes a video motion graph generating module 910. The video motion graph generating module 910 is configured to generate video motion graph (e.g., a directed graph) that encodes how a reference speech video may be split and re-assembled via different graph paths. Each graph node of the video motion graph includes a raw reference video frame and corresponding audio features. The edges between nodes are defined as the transitions between frames, including natural transitions that connect consecutive frames in the reference video sequence and synthetic transitions connecting disjointed, or non-consecutive, frames of the reference video sequence. To generate the synthetic transitions, the video motion graph generating module 910 can analyze, pair-wise, the plurality of video frames generated by the video processing module 908 and create synthetic transitions between pairs of video frames whose pose data are the same or withing a threshold range of each other.

As further illustrated in FIG. 9, the digital design system 900 also includes a graph searching module 912. The graph searching module 912 is configured to perform a search process on the video motion graph generated by the video motion graph generating module 910. The search process can be a beam search that identifies one or more plausible node paths through the nodes of the video motion graph (e.g., via natural and synthetic transitions) that best fits a target audio sequence.

As further illustrated in FIG. 9, the digital design system 900 also includes a video synthesizing module 914 configured to generate a media sequence from the node path identified by the graph searching module 912. The video synthesizing module 914 may include a pose-aware video blending network 920 configured to blend video frames in a temporal neighborhood surrounding a synthetic transition. The pose-aware video blending network 920 can be implemented as, or include, one or more machine learning models, such as a neural network or a deep learning model. In one or more embodiments, a neural network includes deep learning architecture for learning representations of audio and/or video. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

As further illustrated in FIG. 9, the digital design system 900 includes training system 916 which is configured to teach, guide, tune, and/or train one or more neural networks. In particular, the training system 916 trains neural networks, such as pose-aware video blending network 920, based on training data.

As further illustrated in FIG. 9, the storage manager 918 includes input data 924, video motion graph data 926, and training data 928. In particular, the input data 924 may include an input media sequence (e.g., reference speech videos, target audio sequences, etc.) received by the digital design system 900. In one or more embodiments, the video motion graph data 926 may include video motion graphs generated by the digital design system 900 from reference speech videos. In one or more embodiments, the training data 928 may include training video frames that can be used during a training process of the digital design system 900 to train the pose-aware video blending network 920. The training data 928 includes training video frames generated from a reference video, from which triplets of frames are sampled (e.g., a target frame and randomly sampled nearby frames before and after the target frame).

Each of the components 902-918 of the digital design system 900 and their corresponding elements (as shown in FIG. 9) may be in communication with one another using any suitable communication technologies. It will be recognized that although components 902-918 and their corresponding elements are shown to be separate in FIG. 9, any of components 902-918 and their corresponding elements may be combined into fewer components, such as into a single facility or module, divided into more components, or configured into different components as may serve a particular embodiment.

The components 902-918 and their corresponding elements can comprise software, hardware, or both. For example, the components 902-918 and their corresponding elements can comprise one or more instructions stored on a computer-readable storage medium and executable by processors of one or more computing devices. When executed by the one or more processors, the computer-executable instructions of the digital design system 900 can cause a client device and/or a server device to perform the methods described herein. Alternatively, the components 902-918 and their corresponding elements can comprise hardware, such as a special purpose processing device to perform a certain function or group of functions. Additionally, the components 902-918 and their corresponding elements can comprise a combination of computer-executable instructions and hardware.

Furthermore, the components 902-918 of the digital design system 900 may, for example, be implemented as one or more stand-alone applications, as one or more modules of an application, as one or more plug-ins, as one or more library functions or functions that may be called by other applications, and/or as a cloud-computing model. Thus, the components 902-918 of the digital design system 900 may be implemented as a stand-alone application, such as a desktop or mobile application. Furthermore, the components 902-918 of the digital design system 900 may be implemented as one or more web-based applications hosted on a remote server. Alternatively, or additionally, the components of the digital design system 900 may be implemented in a suit of mobile device applications or "apps."

Figure 10:
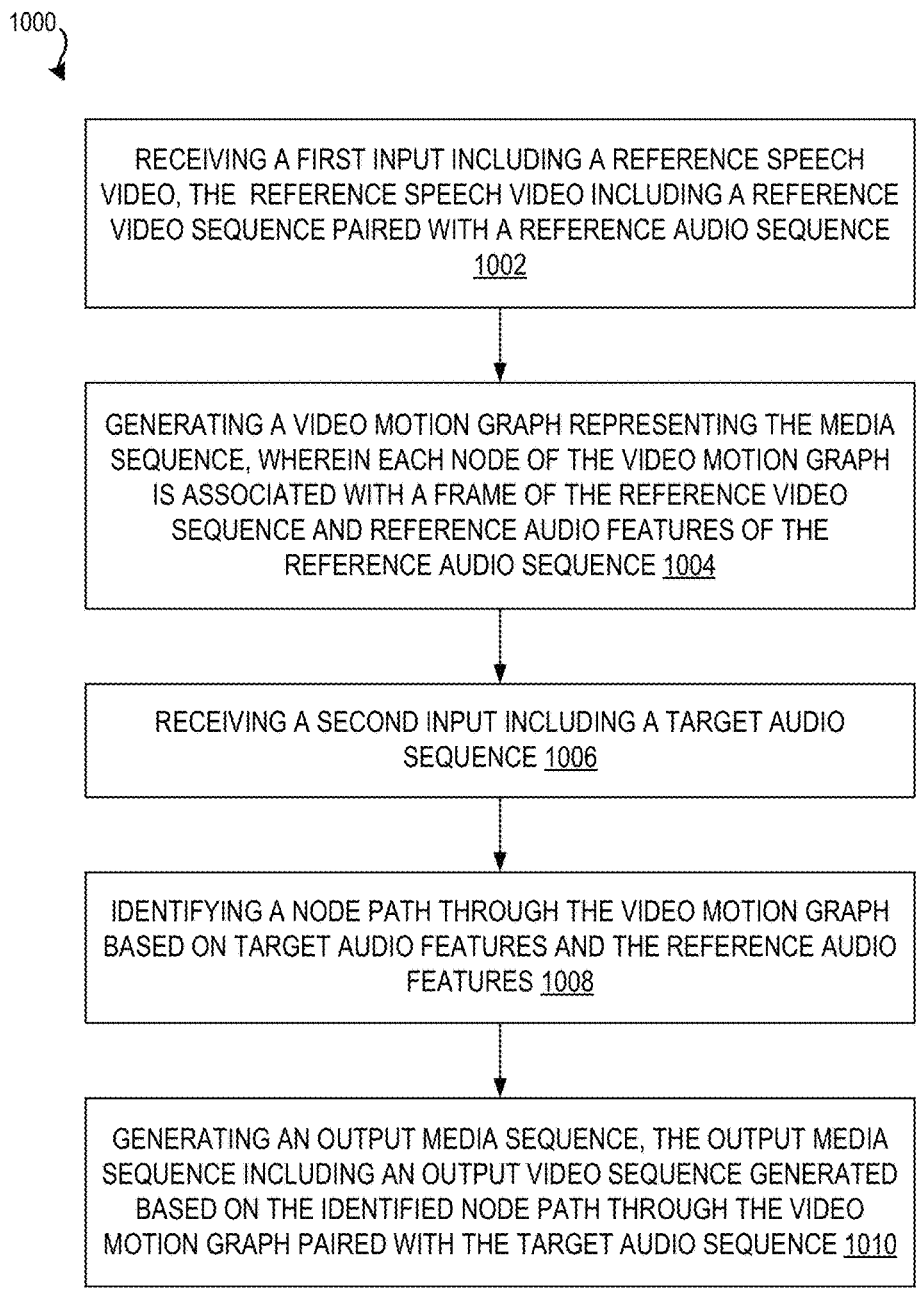
FIG. 10 illustrates a flowchart of a series of acts in a method of generating a gesture reenactment video sequence corresponding to a target audio sequence using a video motion graph generated from a reference speech video in accordance with one or more embodiments.

FIGS. 1-9, the corresponding text, and the examples, provide a number of different systems and devices that allow a digital design system to generate a gesture reenactment video sequence corresponding to a target audio sequence using a video motion graph for a reference speech video. In addition to the foregoing, embodiments can also be described in terms of flowcharts comprising acts and steps in a method for accomplishing a particular result. For example, FIG. 10 illustrates a flowchart of an exemplary method in accordance with one or more embodiments. The method described in relation to FIG. 10 may be performed with less or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart of a series of acts in a method of generating a gesture reenactment video sequence corresponding to a target audio sequence using a video motion graph generated from a reference speech video in accordance with one or more embodiments. In one or more embodiments, the method 1000 is performed in a digital medium environment that includes the digital design system 900. The method 1000 is intended to be illustrative of one or more methods in accordance with the present disclosure and is not intended to limit potential embodiments. Alternative embodiments can include additional, fewer, or different steps than those articulated in FIG. 10.

As shown in FIG. 10, the method 1000 includes an act 1002 of receiving a first input including a reference speech video, the reference speech video including a reference video sequence paired with a reference audio sequence. In one or more embodiments, the first input includes at least the reference speech video to be used to generate a video motion graph. In one or more embodiments, the digital design system receives the first input from a user (e.g., via a computing device). In one or more embodiments, the user may select the reference speech video in an application, or the user may submit the reference speech video to a web service or an application configured to receive inputs. The reference speech video can also be a portion selected from a longer reference speech video. For example, after providing the reference speech video to the application, the application can provide an interface to enable the user to select a portion of the reference speech video. After receiving the first input including the reference speech video, an input analyzer can extract a reference video sequence and a reference audio sequence from the reference speech video.

As shown in FIG. 10, the method 1000 also includes an act 1004 of generating a video motion graph representing the reference speech video, wherein each node of the video motion graph is associated with a frame of the reference video sequence and reference audio features of the reference audio sequence. In one or more embodiments, the video motion graph is generated using video frames data and pose data from a video processing module and a reference audio script and reference audio features from an audio processing module. Each node of the video motion graph can be assigned a video frame from the reference video sequence, reference audio features, and a keyword feature indicating whether a keyword is present at the video frame.

In one or more embodiments, the video processing module generates video frames representing the reference video sequence and pose data for the video frames of the reference video sequence. In one or more embodiments, the video processing module extracts pose parameters, $\theta$, of the SMPL model for all frames of the reference video sequence.

In one or more embodiments, the audio processing module processes the reference audio sequence to generate a reference audio transcript and reference audio features. In one or more embodiments, reference audio features 614 include audio onset features and keyword features. Audio onset features are defined as a binary value indicating the activation of an audio onset for each frame detected. In one or more embodiments, a standard audio processing algorithm is used to detect audio onset frames. For example, the reference audio sequence can be processed to detect audio onset locations and, in response to an audio onset location being detected in the reference audio sequence, a first value can be assigned to the node when the video motion graph is generated as an audio onset feature for the node.

To extract keyword features, a speech-to-text engine can convert the reference audio sequence into a reference audio transcript and keywords can be identified from the transcript. For example, after the reference audio transcript is generated, it can be analyzed for each node of the video motion graph to detect an occurrence of a keyword from a keyword dictionary. In response to detecting the occurrence of a keyword, the keyword can be assigned as a keyword feature for the corresponding node of the video motion graph.

The nodes of the video motion graph are connected by edges, where the edges between consecutive video frames are natural transitions. Generating the video motion graph can further include creating synthetic transitions between non-consecutive nodes of the video motion graph. Synthetic transitions can be created by first extracting pose parameters for video frames associated with each node of the video motion graph. For each non-consecutive pair of nodes in the video motion graph, a similarity metric is calculated based on extracted pose parameters for the non-consecutive pair of nodes. When the calculated similarity metric is below a threshold (e.g., indicating the poses in the nodes are similar), a synthetic transition is generated between the non-consecutive pair of nodes. When the calculated similarity metric is above the threshold, a synthetic transition is not generated.

As shown in FIG. 10, the method 1000 also includes an act 1006 of receiving a second input including a target audio sequence. In one or more embodiments, the second input includes at least a target audio sequence for which a user is requesting a media sequence to be generated for using the video motion graph. In one or more embodiments, the digital design system receives the second input from a user (e.g., via a computing device). In one or more embodiments, the user may select the target audio sequence in an application, or the user may submit the target audio sequence to a web service or an application configured to receive inputs.

As shown in FIG. 10, the method 1000 also includes an act 1008 of identifying a node path through the video motion graph based on the target audio features and the reference audio features. In one or more embodiments, the target audio sequence is segmented based on the generated target audio features, which can then be used to identify a node path. For example, identifying the node path can include performing a beam search to identify an initial node in the video motion graph having reference audio features similar to the target audio features for a first frame associated with a first segment of the segmented target audio sequence. For each segment of the segmented target audio sequence, a beam search is performed of the video motion graph to identify a node path segment with an ending node having reference audio features matching the target audio features for a final frame associated with the segment. Each node path segment can be of varying length (e.g., in nodes) and can traverse natural and/or synthetic transitions. The node path is then generated by aggregating the identified path segments.

As shown in FIG. 10, the method 1000 also includes an act 1010 of generating an output media sequence, the output media sequence including an output video sequence generated based on the identified node path through the video motion graph paired with the target audio sequence. In one or more embodiments, generating the output media sequence includes blending video frames around synthetic transitions in the identified node path. In one or more embodiments, synthetic transitions can be identified by identifying pair of consecutive nodes in the identified node path that are non-consecutive nodes in the video motion graph. For each of the those identified pairs, a trained neural network can be used to blend frames of the reference video associated with the one or more nodes surrounding the identified pair of consecutive nodes. The number of the one or more nodes surrounding the synthetic transition can be a user-specified parameters.

Figure 11:
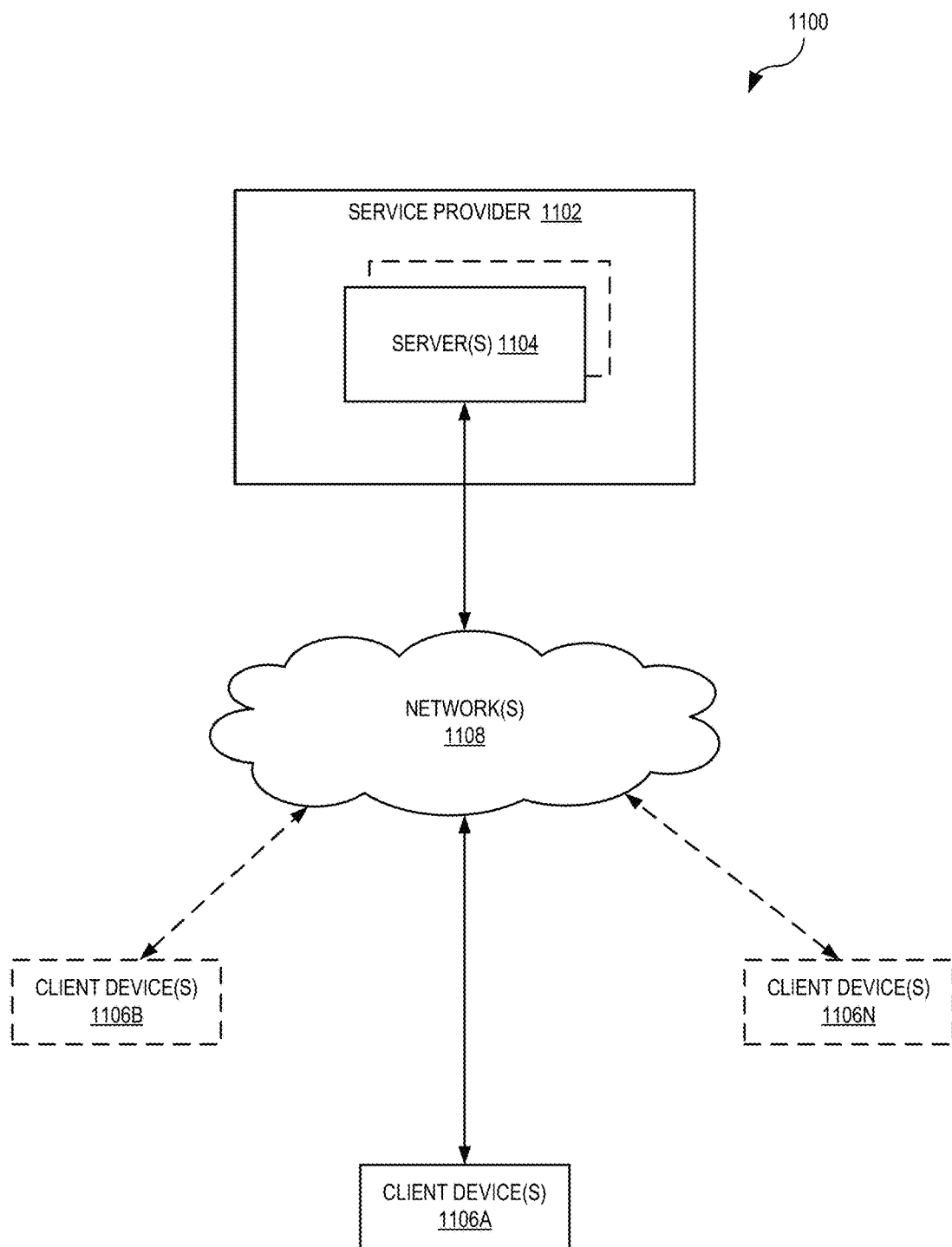
FIG. 11 illustrates a schematic diagram of an exemplary environment in which the digital design system can operate in accordance with one or more embodiments.

FIG. 11 illustrates a schematic diagram of an exemplary environment 1100 in which the digital design system 900 can operate in accordance with one or more embodiments. In one or more embodiments, the environment 1100 includes a service provider 1102 which may include one or more servers 1104 connected to a plurality of client devices 1106A-1106N via one or more networks 1108. The client devices 1106A-1106N, the one or more networks 1108, the service provider 1102, and the one or more servers 1104 may communicate with each other or other components using any communication platforms and technologies suitable for transporting data and/or communication signals, including any known communication technologies, devices, media, and protocols supportive of remote data communications, examples of which will be described in more detail below with respect to FIG. 12.

Although FIG. 11 illustrates a particular arrangement of the client devices 1106A-1106N, the one or more networks 1108, the service provider 1102, and the one or more servers 1104, various additional arrangements are possible. For example, the client devices 1106A-1106N may directly communicate with the one or more servers 1104, bypassing the network 1108. Or alternatively, the client devices 1106A-1106N may directly communicate with each other. The service provider 1102 may be a public cloud service provider which owns and operates their own infrastructure in one or more data centers and provides this infrastructure to customers and end users on demand to host applications on the one or more servers 1104. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1104. In some embodiments, the service provider may be a private cloud provider which maintains cloud infrastructure for a single organization. The one or more servers 1104 may similarly include one or more hardware servers, each with its own computing resources, which are divided among applications hosted by the one or more servers for use by members of the organization or their customers.

Similarly, although the environment 1100 of FIG. 11 is depicted as having various components, the environment 1100 may have additional or alternative components. For example, the environment 1100 can be implemented on a single computing device with the digital design system 900. In particular, the digital design system 900 may be implemented in whole or in part on the client device 1106A.

Alternatively, in some embodiments, the environment 1100 is implemented in a distributed architecture across multiple computing devices.

As illustrated in FIG. 11, the environment 1100 may include client devices 1106A-1106N. The client devices 1106A-1106N may comprise any computing device. For example, client devices 1106A-1106N may comprise one or more personal computers, laptop computers, mobile devices, mobile phones, tablets, special purpose computers, TVs, or other computing devices, including computing devices described below with regard to FIG. 12. Although three client devices are shown in FIG. 11, it will be appreciated that client devices 1106A-1106N may comprise any number of client devices (greater or smaller than shown).

Moreover, as illustrated in FIG. 11, the client devices 1106A-1106N and the one or more servers 1104 may communicate via one or more networks 1108. The one or more networks 1108 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1108 may be any suitable network over which the client devices 1106A-1106N may access the service provider 1102 and server 1104, or vice versa. The one or more networks 1108 will be discussed in more detail below with regard to FIG. 12.

In addition, the environment 1100 may also include one or more servers 1104. The one or more servers 1104 may generate, store, receive, and transmit any type of data, including input data 924, video motion graph data 926, training data 928, or other information. For example, a server 1104 may receive data from a client device, such as the client device 1106A, and send the data to another client device, such as the client device 1106B and/or 1106N. The server 1104 can also transmit electronic messages between one or more users of the environment 1100. In one example embodiment, the server 1104 is a data server. The server 1104 can also comprise a communication server or a web-hosting server. Additional details regarding the server 1104 will be discussed below with respect to FIG. 12.

As mentioned, in one or more embodiments, the one or more servers 1104 can include or implement at least a portion of the digital design system 900. In particular, the digital design system 900 can comprise an application running on the one or more servers 1104 or a portion of the digital design system 900 can be downloaded from the one or more servers 1104. For example, the digital design system 900 can include a web hosting application that allows the client devices 1106A-1106N to interact with content hosted at the one or more servers 1104. To illustrate, in one or more embodiments of the environment 1100, one or more client devices 1106A-1106N can access a webpage supported by the one or more servers 1104. In particular, the client device 1106A can run a web application (e.g., a web browser) to allow a user to access, view, and/or interact with a webpage or website hosted at the one or more servers 1104.

Upon the client device 1106A accessing a webpage or other web application hosted at the one or more servers 1104, in one or more embodiments, the one or more servers 1104 can provide a user of the client device 1106A with an interface to provide inputs, including a reference speech video and/or a target audio sequence. Upon receiving the reference speech video and/or the target audio sequence, the one or more servers 1104 can automatically perform the methods and processes described above to generate a gesture reenactment video sequence.

As just described, the digital design system 900 may be implemented in whole, or in part, by the individual elements 1102-1108 of the environment 1100. It will be appreciated that although certain components of the digital design system 900 are described in the previous examples with regard to particular elements of the environment 1100, various alternative implementations are possible. For instance, in one or more embodiments, the digital design system 900 is implemented on any of the client devices 1106A-1106N. Similarly, in one or more embodiments, the digital design system 900 may be implemented on the one or more servers 1104. Moreover, different components and functions of the digital design system 900 may be implemented separately among client devices 1106A-1106N, the one or more servers 1104, and the network 1108.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
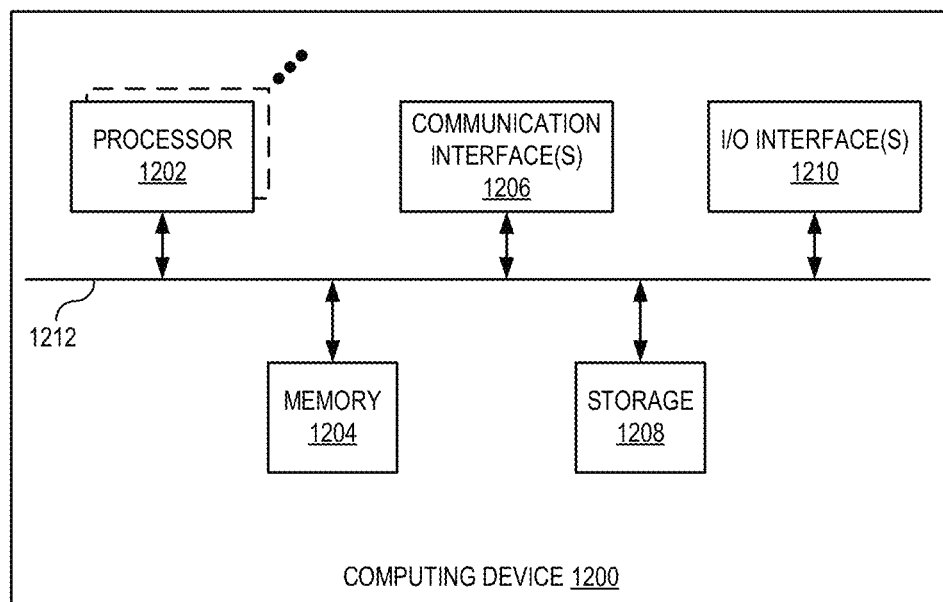
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that one or more computing devices such as the computing device 1200 may implement the digital design system 900. As shown by FIG. 12, the computing device can comprise a processor 1202, memory 1204, one or more communication interfaces 1206, a storage device 1208, and one or more input or output ("I/O") devices/interfaces 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1208 and decode and execute them. In various embodiments, the processor(s) 1202 may include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 can further include one or more communication interfaces 1206. A communication interface 1206 can include hardware, software, or both. The communication interface 1206 can provide one or more interfaces for communication (such as, for example, packet-based communication) between the computing device and one or more other computing devices 1200 or one or more networks. As an example, and not by way of limitation, communication interface 1206 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

The computing device 1200 includes a storage device 1208 includes storage for storing data or instructions. As an example, and not by way of limitation, storage device 1208 can comprise a non-transitory storage medium described above. The storage device 1208 may include a hard disk drive (HDD), flash memory, a Universal Serial Bus (USB) drive or a combination these or other storage devices. The computing device 1200 also includes one or more I/O devices/interfaces 1210, which are provided to allow a user to provide input to (such as user strokes), receive output from, and otherwise transfer data to and from the computing device 1200. These I/O devices/interfaces 1210 may include a mouse, keypad or a keyboard, a touch screen, camera, optical scanner, network interface, modem, other known I/O devices or a combination of such I/O devices/interfaces 1210. The touch screen may be activated with a stylus or a finger.

The I/O devices/interfaces 1210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   receiving a first input including a reference speech video, the reference speech video including a reference video sequence paired with a reference audio sequence;
   generating a video motion graph representing the reference speech video, wherein each node of the video motion graph is associated with a frame of the reference video sequence and reference audio features of the reference audio sequence;
   receiving a second input including a target audio sequence;
   identifying a node path through the video motion graph based on target audio features and the reference audio features; and
   generating an output media sequence, the output media sequence including an output video sequence generated based on the identified node path through the video motion graph paired with the target audio sequence, including blending, by a trained neural network, frames of the reference video associated with one or more nodes surrounding pairs of consecutive nodes in the identified node path that are non-consecutive nodes in the video motion graph.

2. The method of claim 1, wherein generating the video motion graph representing the reference speech video comprises:
 extracting pose parameters for frames associated with each node of the video motion graph; and
 for each non-consecutive pair of nodes in the video motion graph,
  calculating a similarity metric between the non-consecutive pair of nodes based on extracted pose parameters for the non-consecutive pair of nodes, and
  in response to the calculated similarity metric being below a threshold, generating a synthetic transition between the non-consecutive pair of nodes.

3. The method of claim 1, wherein the reference audio features include keyword features and audio onset features.

4. The method of claim 1, further comprising:
 generating a reference audio transcript for the reference audio sequence;
 analyzing the reference audio transcript for each node of the video motion graph to detect an occurrence of one of a set of keywords from a keyword dictionary; and
 in response to detecting the occurrence of a keyword from the set of keywords, assigning the keyword as a keyword feature for a corresponding node of the video motion graph.

5. The method of claim 1, further comprising:
 processing the reference audio sequence to detect audio onset locations; and
 in response to detecting an audio onset location in the reference audio sequence, assigning a first value as an audio onset feature for a corresponding node of the video motion graph.

6. The method of claim 1, wherein identifying the node path through the video motion graph based on the target audio features and the reference audio features comprises:
 segmenting the target audio sequence based on the target audio features;
 performing a beam search to identify an initial node in the video motion graph having reference audio features similar to the target audio features for a first frame associated with a first segment of the segmented target audio sequence;
 for each segment of the segmented target audio sequence:
  performing a beam search of the video motion graph to identify a node path segment with an ending node having reference audio features matching the target audio features for a final frame associated with the segment; and
 generating the node path by aggregating identified path segments.

7. A non-transitory computer-readable storage medium storing executable instructions, which when executed by a processing device, cause the processing device to perform operations comprising:
 receiving a first input including a reference speech video, the reference speech video including a reference video sequence paired with a reference audio sequence;
 generating a video motion graph representing the reference speech video, wherein each node of the video motion graph is associated with a frame of the reference video sequence and reference audio features of the reference audio sequence;
 receiving a second input including a target audio sequence;
 identifying a node path through the video motion graph based on target audio features and the reference audio features; and
 generating an output media sequence, the output media sequence including an output video sequence generated based on the identified node path through the video motion graph paired with the target audio sequence, including blending, by a trained neural network, frames of the reference video associated with one or more nodes surrounding pairs of consecutive nodes in the identified node path that are non-consecutive nodes in the video motion graph.

8. The non-transitory computer-readable storage medium of claim 7, wherein to generate the video motion graph representing the reference speech video the instructions further cause the processing device to perform operations comprising:
 extracting pose parameters for frames associated with each node of the video motion graph; and
 for each non-consecutive pair of nodes in the video motion graph,
  calculating a similarity metric between the non-consecutive pair of nodes based on extracted pose parameters for the non-consecutive pair of nodes, and
  in response to the calculated similarity metric being below a threshold, generating a synthetic transition between the non-consecutive pair of nodes.

9. The non-transitory computer-readable storage medium of claim 7, wherein the reference audio features include keyword features and audio onset features.

10. The non-transitory computer-readable storage medium of claim 7, wherein the instructions further cause the processing device to perform operations comprising:
 generating a reference audio transcript for the reference audio sequence;
 analyzing the reference audio transcript for each node of the video motion graph to detect an occurrence of one of a set of keywords from a keyword dictionary; and
 in response to detecting the occurrence of a keyword from the set of keywords, assigning the keyword as a keyword feature for a corresponding node of the video motion graph.

11. The non-transitory computer-readable storage medium of claim 7, wherein the instructions further cause the processing device to perform operations comprising:
 processing the reference audio sequence to detect audio onset locations; and
 in response to detecting an audio onset location in the reference audio sequence, assigning a first value as an audio onset feature for a corresponding node of the video motion graph.

12. The non-transitory computer-readable storage medium of claim 7, wherein to identify the node path through the video motion graph based on the target audio features and the reference audio features the instructions further cause the processing device to perform operations comprising:
 segmenting the target audio sequence based on the target audio features;
 performing a beam search to identify an initial node in the video motion graph having reference audio features similar to the target audio features for a first frame associated with a first segment of the segmented target audio sequence;

for each segment of the segmented target audio sequence:
performing a beam search of the video motion graph to identify a node path segment with an ending node having reference audio features matching the target audio features for a final frame associated with the segment; and generating the node path by aggregating identified path segments.

13. A system comprising:
a memory component; and
a processing device coupled to the memory component, the processing device to perform operations comprising:
receiving a first input including a reference speech video, the reference speech video including a reference video sequence paired with a reference audio sequence;
generating a video motion graph representing the reference speech video, wherein each node of the video motion graph is associated with a frame of the reference video sequence and reference audio features of the reference audio sequence;
receiving a second input including a target audio sequence;
identifying a node path through the video motion graph based on target audio features and the reference audio features; and
generating an output media sequence, the output media sequence including an output video sequence generated based on the identified node path through the video motion graph paired with the target audio sequence, including blending, by a trained neural network, frames of the reference video associated with one or more nodes surrounding pairs of consecutive nodes in the identified node path that are non-consecutive nodes in the video motion graph.

14. The system of claim 13, wherein to generate the video motion graph representing the reference speech video the processing device further performs operations comprising:
extracting pose parameters for frames associated with each node of the video motion graph; and
for each non-consecutive pair of nodes in the video motion graph,
calculating a similarity metric between the non-consecutive pair of nodes based on extracted pose parameters for the non-consecutive pair of nodes, and
in response to the calculated similarity metric being below a threshold, generating a synthetic transition between the non-consecutive pair of nodes.

15. The system of claim 13, wherein the processing device further performs operations comprising:
generating a reference audio transcript for the reference audio sequence;
analyzing the reference audio transcript for each node of the video motion graph to detect an occurrence of one of a set of keywords from a keyword dictionary; and
in response to detecting the occurrence of a keyword from the set of keywords, assigning the keyword as a keyword feature for a corresponding node of the video motion graph.

16. The system of claim 13, wherein the processing device further performs operations comprising:
processing the reference audio sequence to detect audio onset locations; and
in response to detecting an audio onset location in the reference audio sequence, assigning a first value as an audio onset feature for a corresponding node of the video motion graph.

17. The system of claim 13, wherein to identify the node path through the video motion graph based on the target audio features and the reference audio features the processing device further performs operations comprising:
segmenting the target audio sequence based on the target audio features;
performing a beam search to identify an initial node in the video motion graph having reference audio features similar to the target audio features for a first frame associated with a first segment of the segmented target audio sequence;
for each segment of the segmented target audio sequence:
performing a beam search of the video motion graph to identify a node path segment with an ending node having reference audio features matching the target audio features for a final frame associated with the segment; and
generating the node path by aggregating identified path segments.

* * * * *